United States Patent
Kamada et al.

(10) Patent No.: US 9,084,935 B2
(45) Date of Patent: Jul. 21, 2015

(54) ATTACHMENT DEVICE FOR AN ELECTRONIC APPARATUS

(75) Inventors: Hiroshi Kamada, Kyoto (JP); Kazuo Yoneyama, Kyoto (JP); Masaki Amano, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1958 days.

(21) Appl. No.: 12/222,802

(22) Filed: Aug. 15, 2008

(65) Prior Publication Data
US 2009/0082115 A1 Mar. 26, 2009

(30) Foreign Application Priority Data

Sep. 13, 2007 (JP) ................................ 2007-238071
Sep. 19, 2007 (JP) ................................ 2007-243124

(51) Int. Cl.
*H01R 13/62* (2006.01)
*A63F 13/90* (2014.01)
*G07F 17/32* (2006.01)
*G06K 13/00* (2006.01)

(52) U.S. Cl.
CPC ........... *A63F 13/08* (2013.01); *A63F 2300/206* (2013.01); *G06K 13/00* (2013.01); *G07F 17/3202* (2013.01)

(58) Field of Classification Search
USPC ................. 439/159; 361/679.57–679.58
See application file for complete search history.

(56) References Cited

U.S. PATENT DOCUMENTS

| | | | |
|---|---|---|---|
| 3,797,870 A | 3/1974 | Beckman | |
| 4,138,151 A | 2/1979 | Nakao | |
| 5,263,346 A | 11/1993 | Sato et al. | |
| 5,472,351 A * | 12/1995 | Greco et al. | 439/353 |
| 6,125,040 A * | 9/2000 | Nobuchi et al. | 361/726 |
| 6,439,956 B1 * | 8/2002 | Ho | 446/454 |
| 6,482,020 B1 * | 11/2002 | Yeh | 439/159 |
| 6,580,615 B1 * | 6/2003 | Nakanishi et al. | 361/737 |
| 7,066,394 B2 * | 6/2006 | Kondo et al. | 235/492 |
| 7,118,394 B2 * | 10/2006 | Yoneyama et al. | 439/159 |
| 7,644,963 B2 | 1/2010 | Fan et al. | |

(Continued)

FOREIGN PATENT DOCUMENTS

| | | | | |
|---|---|---|---|---|
| CN | 101083886 | 6/2006 | | |
| EP | 1365562 A1 * | 11/2003 | .............. | H04M 1/02 |

(Continued)

OTHER PUBLICATIONS

Office Action (7 pgs.) dated Jan. 24, 2011 issued in co-pending U.S. Appl. No. 12/222,866.

(Continued)

*Primary Examiner* — Jason Yen
(74) *Attorney, Agent, or Firm* — Nixon & Vanderhye, P.C.

(57) ABSTRACT

A cartridge, which is an attachment device, is mountable into an insertion slot in a game apparatus. At a side surface inside the insertion slot, a slide member is movable from a near side to a far side. The attachment device includes a housing and a hook. When the attachment device is inserted into the insertion slot, a predetermined portion of the housing abuts against the slide member, and the slide member is caused to move toward the far side of the insertion slot when the predetermined portion is inserted further inside while abutting against the slide member. The hook is inserted into a recessed portion generated at the side surface inside the insertion slot when the slide member moves toward the far side of the insertion slot, and then latches onto the inside wall.

3 Claims, 20 Drawing Sheets

(56) References Cited

U.S. PATENT DOCUMENTS

| | | | |
|---|---|---|---|
| 2003/0194897 A1* | 10/2003 | Nishioka | 439/325 |
| 2004/0009691 A1* | 1/2004 | Chang | 439/159 |
| 2004/0014342 A1* | 1/2004 | Yu et al. | 439/159 |
| 2005/0202716 A1* | 9/2005 | Saito | 439/527 |
| 2005/0206169 A1* | 9/2005 | Lin et al. | 292/24 |
| 2007/0120372 A1* | 5/2007 | Zhang et al. | 292/8 |
| 2007/0138806 A1* | 6/2007 | Ligtenberg et al. | 292/251.5 |
| 2007/0141902 A1* | 6/2007 | Barina et al. | 439/567 |
| 2008/0101787 A1* | 5/2008 | Kuo | 396/310 |
| 2008/0218953 A1* | 9/2008 | Yun et al. | 361/681 |
| 2009/0082115 A1 | 3/2009 | Kamada et al. | |
| 2009/0141437 A1 | 6/2009 | Geiger et al. | |

FOREIGN PATENT DOCUMENTS

| | | |
|---|---|---|
| JP | 62-74763 U | 5/1987 |
| JP | 2-77736 U | 6/1990 |
| JP | 3-101870 U | 10/1991 |
| JP | 06-044413 | 2/1994 |
| JP | 2003-77585 A | 3/2003 |
| JP | 2004-87480 | 3/2004 |
| WO | WO 03/021724 A1 | 3/2003 |

OTHER PUBLICATIONS

Office Action mailed Aug. 31, 2012 in U.S. Appl. No. 12/222,866 (9 pages).

* cited by examiner

ATTACHMENT DEVICE FOR AN ELECTRONIC APPARATUS

CROSS REFERENCE TO RELATED APPLICATION

The disclosure of Japanese Patent Application No. 2007-243124, filed Sep. 19, 2007 and Japanese Patent Application No. 2007-238071, filed Sep. 13, 2007, is incorporated herein by reference.

BACKGROUND AND SUMMARY

The technology presented herein relates to an attachment device attached to an electronic apparatus and an electronic apparatus system, and more particularly relates to an attachment device attached to an electronic apparatus and an electronic apparatus system including the electronic apparatus and the attachment device.

Conventionally, a technique for detachably mounting an attachment device such as a cartridge into an electronic apparatus has been developed. In this technique, it is important to firmly mount the attachment device such that the attachment device having been mounted in the electronic apparatus is not dismounted therefrom accidentally. For example, in Patent document 1 (Japanese Laid-Open Patent Publication No. 2004-087480), disclosed is a mechanism for preventing a card from being dismounted (ejected) accidentally from a card connector in which a card (the attachment device) is inserted. In the mechanism for preventing the card from being dismounted, a card-retaining lid is provided at a card insertion slot. When a card is inserted into the card connector, the card is retained by the card-retaining lid, whereby the card is prevented from being dismounted accidentally.

According to the technique disclosed in the above-described Patent document 1, the mechanism for preventing the card from being dismounted needs to be additionally provided to a main body (electronic apparatus) into which the attachment device is mounted. Therefore, the above-described technique cannot be applicable to conventional electronic apparatuses which do not have the additional mechanism for preventing the attachment device from being dismounted, and thus lacks versatility.

Therefore, a feature of an example embodiment presented herein is to provide an attachment device which is capable of preventing the attachment device from being dismounted accidentally from an electronic apparatus which does not have the additional mechanism for preventing the dismounting.

The present embodiment has the following configurations to attain the object described above. The reference numerals, supplementary explanations and the like in the parentheses indicate the correspondence with the embodiment described below in order to aid in understanding the present embodiment and are not intended to limit, in any way, the scope of the present embodiment.

A first aspect is an electronic apparatus system including an electronic apparatus (game apparatus 5) having an insertion slot (8), and a first attachment device (game cartridge 9) and a second attachment device (antenna cartridge 1) which are mountable into the insertion slot. The electronic apparatus includes a moving member (slide member 41), a stop mechanism (pin supporting member 42, heart cam 49, and pin 45). The moving member is provided in a moving area provided along a side surface inside the insertion slot so as to be movable between a near side and a far side of the insertion slot, and has a first latch portion (protruding portion 48c) for latching onto the first attachment device inserted into the insertion slot. The stop mechanism selectively causes the moving member to stop at either of a predetermined position at the far side and a predetermined position at the near side of the insertion slot. The first attachment device includes a first latch bay portion (second recessed portion 92 of the first attachment device, hereinafter referred to as "second recessed portion 92") for engaging with the first latch portion. The second attachment device includes a second latch portion (hook 14) which is inserted into an air gap (air gap A1) generated in the moving area when the moving member is stopped at the predetermined position at the far side and which latches onto the side surface inside the insertion slot.

In a second aspect, when the first attachment device is mounted in the electronic apparatus, a whole of the first attachment device may be inserted in the insertion slot. On the other hand, when the second attachment device is mounted in the electronic apparatus, at least a part of the second attachment device protrudes outward from the insertion slot.

In a third aspect, the second attachment device may further include a second latch bay portion (second recessed portion 16 of the second attachment device, hereinafter referred to as "second recessed portion 16") for engaging with the first latch portion.

In a fourth aspect, the moving member includes an abutment portion (projecting portion 47) which abuts against a predetermined portion of the first attachment device or the second attachment device (first recessed portion 15 of the first attachment device, or first recessed portion 91 of the second attachment device, hereinafter referred to as "first recessed portion 15" and "first recessed portion 91" respectively) inserted into the insertion slot. The predetermined portion of the first attachment device or the second attachment device, which is inserted into the insertion slot, abuts against the abutment portion, and the moving member moves toward the far side when the attachment device is inserted further. The stop mechanism causes the moving member, which moves from the near side to the far side, to stop at a predetermined position at the far side.

In a fifth aspect, the electronic apparatus may further include a biasing member (spring 44) for biasing the moving member toward the near side of the insertion slot. The stop mechanism (heart cam 49, pin 45, and pin supporting member 42) includes a first stop function for causing the moving member to stop at the predetermined position at the far side against a bias force by the biasing member, and a second stop function for causing the moving member to stop at the predetermined position at the near side against the bias force by the biasing member.

In a sixth aspect, the electronic apparatus may further include a biasing member (spring 44) for biasing the moving member toward the near side of the insertion slot. The moving member includes an abutment portion (projecting portion 47) which abuts against a front edge portion (first recessed portion 15 or first recessed portion 91) of the first attachment device or the second attachment device inserted into the insertion slot. Further, when the front edge of the first attachment device or the second attachment device, which is inserted into the insertion slot, abuts against the abutment portion, the moving member moves toward the far side along with the attachment device being inserted further. The stop mechanism causes the moving member, which moves from the near side to the far side, to stop at the predetermined position at the far side, and also, when the stoppage ceases and the moving member moves from the far side to a predetermined position at the near side due to a bias force by the bias member, causes the moving member to stop at the predetermined position at the near side.

In a seventh aspect, the stop mechanism may be a push-in/push-out insertion/ejection mechanism.

In an eighth aspect, the predetermined position at the far side may be arranged such that the whole of the first attachment device is inserted in the insertion slot when the latch portion of the moving member latches onto the latch bay portion of the first attachment device. The predetermined position at the near side is arranged such that at least a part of the first attachment device protrudes outward from the insertion slot when the latch portion of the moving member latches onto the latch bay portion of the first attachment device.

In a ninth aspect, the second attachment device may include an operation section for causing the second latch portion to be in a non-latched state.

A tenth aspect is an electronic apparatus system including an electronic apparatus (game apparatus 5) having an insertion slot (8) and an attachment device (antenna cartridge 1) mountable into the insertion slot. The electronic apparatus includes a moving member (slide member 41), and a stop mechanism (pin supporting member 42, heart cam 49, and pin 45). The moving member has an abutment portion (projecting portion 47) which abuts against a predetermined portion (first recessed portion 15) of the attachment device inserted into the insertion slot. Further, the moving member is provided in a moving area along a side surface inside the insertion slot so as to be movable between a near side and a far side of the insertion slot. The stop mechanism for selectively causing the moving member to stop at either of a predetermined position at the far side and a predetermined position at the near side of the insertion slot. The attachment device includes a housing (housing 11 (insertion part 11a)) and a latch portion. The housing has a predetermined portion which abuts against the abutment portion when the attachment device inserted into the insertion slot, and causes the moving member to move toward the far side of the insertion slot when the predetermined portion is further inserted into the insertion slot while being abutting against the abutment portion. The latch portion which is inserted into an air gap (air gap A1) generated in the moving area while the moving member stops at the predetermined position at the far side, and which latches onto the side surface inside the insertion slot.

An eleventh aspect is an attachment device (antenna cartridge 1) mountable into an insertion slot (8) provided in an electronic apparatus (game apparatus 5). The moving member (slide member 41) is provided at a side surface inside the insertion slot, and is movable, between a near side and a far side of the insertion slot, in a moving area provided along the side surface inside the insertion slot. The attachment device includes a housing (housing 11 (insertion part 11a)) and a latch portion (hook 14). The housing has a predetermined portion (first recessed portion 15) which abuts against the abutment portion when the attachment device is inserted into the insertion slot, and causes the moving member to move toward the far side of the insertion slot when the predetermined portion is further inserted into the insertion slot while being abutting against the abutment portion. The latch portion which is inserted into an air gap (air gap A1) generated in the moving area when the moving member moves toward the far side, and which latches onto the side surface inside the insertion slot.

In a twelfth aspect, moving member may have a projecting portion (47). In this case, the predetermined portion is a front edge portion of the housing, the front edge portion abutting against the projecting portion when the housing is inserted into the insertion slot.

In a thirteenth aspect, the housing has a hole (hook hole 17) on a side surface thereof, and supports the latch portion such that a part of the latch portion (latch portion 23) is protrusible from the hole. The attachment device further includes an elastic member (spring 32) and a button (13). The elastic member biases the latch portion such that the part of the latch portion protrudes outward from the housing through the hole. The button is operable outside the housing, and is operated to cause the elastic member to be elastically deformed such that the part of the latch portion is housed inside the housing.

According to the first aspect, the first latch portion of the moving member of the electronic apparatus latches onto the first latch bay portion of the first attachment device, whereby the first attachment device is mounted and fixed to the electronic apparatus. On the other hand, the second latch portion of the second attachment device is inserted into an air gap, which is generated in a moving area, and latches onto the inside wall of the insertion slot when the moving member of the electronic apparatus stops at the predetermined position at the far side, whereby the second attachment device is mounted and fixed to the electronic apparatus. Therefore, according to the first aspect, the electronic apparatus is capable of mounting both of the first attachment device and the second attachment device. Further, the second attachment device is fixed to the electronic apparatus by using a mechanism different from that of the first attachment device. Therefore, even if the mechanism (mounting mechanism using the first latch portion and the first latch bay portion) for mounting the first attachment device into the electronic apparatus does not have a function for preventing the attachment device from being dismounted accidentally, it is possible to prevent the second attachment device from being dismounted accidentally from the electronic apparatus. That is, it is possible to prevent the second attachment device from being dismounted from the electronic apparatus which does not have the additional mechanism for preventing the dismounting. Further, according to the first aspect, it is possible to realize the mechanism for mounting both of the first and the second attachment devices by using an efficient configuration. For example, even if an electronic apparatus system configured with the first attachment device and the electronic apparatus is already available on the market, it is possible to additionally distribute the second attachment device as the attachment device to be mounted to the electronic apparatus.

According to the second aspect, even if at least a part of the second attachment device protrudes outward from the insertion slot, it is possible to mount the second attachment device into the electronic apparatus stably.

According to the third aspect, the second attachment device may be also fixed to the electronic apparatus when the second latch bay portion is engaged with the first latch portion.

According to the fourth aspect, it is possible to realize, with an efficient configuration, a mechanism for causing the first attachment device to move integrally with the moving member and a mechanism for generating the air gap for accommodating the second attachment device.

According to the fifth and sixth aspects, it is possible to easily realize a mechanism for selectively causing the moving member to stop at either of the predetermined position at the far side and the predetermined position at the near side of the insertion slot.

According to the seventh aspect, even if the electronic apparatus has the push-in/push-out insertion/ejection mechanism, that is, even if the electronic apparatus has the mounting mechanism conventionally available, the second attachment device can be fixed to the electronic apparatus.

According to the eighth aspect, even if the second attachment device is shaped such that at least a part thereof protrudes outward from the insertion slot, the second attachment device can be stably mounted into the electronic apparatus.

According to the ninth aspect, the user can release the second latch portion from being latched onto the side surface inside the insertion slot. Accordingly, the user can easily dismount the attachment device from the electronic apparatus.

According to the tenth aspect, the attachment device has the second latch portion which latches onto the inside wall of the insertion slot of the electronic apparatus, and is thus fixed to the electronic apparatus. Accordingly, even if an additional mechanism for preventing the attachment device from being dismounted accidentally is not provided to the electronic apparatus, it is possible to prevent the attachment device from being dismounted accidentally. That is, according to the tenth aspect, even if the electronic apparatus does not have the additional mechanism for preventing the attachment device from being dismounted accidentally, it is possible to prevent the attachment device from being dismounted as long as the electronic apparatus has the moving member.

According to the eleventh aspect, the attachment device has the latch portion which latches onto the side surface inside the insertion slot of the electronic apparatus, and is thus fixed to the electronic apparatus. Therefore, according to the eleventh aspect, in the same manner as the tenth aspect, even if the electronic apparatus does not have the additional mechanism for preventing the attachment device from being dismounted accidentally, it is possible to prevent the attachment device from being dismounted as long as the electronic apparatus has the moving member.

According to the twelfth aspect, it is possible to realize a configuration, in which the moving member is caused to move toward the far side when the attachment device is inserted into the insertion slot, by using a simple configuration, i.e., the projecting portion provided in the moving member and the front edge (of the housing) abutting against the same.

According to the thirteenth aspect, when the button is operated, the latch portion is housed inside the housing. Accordingly, it is possible to release the latch portion from being latched onto the side surface inside the insertion slot. Therefore, the user can easily dismount the attachment device from the electronic apparatus by operating the button.

These and other features, aspects and advantages of the present embodiment will become more apparent from the following detailed description of the present embodiment when taken in conjunction with the accompanying drawings.

DESCRIPTION OF THE PREFERRED EMBODIMENTS

Hereinafter, an attachment device according to one embodiment will be described. In the present embodiment, a case will be described where an electronic apparatus, into which the attachment device is mounted, is a hand-held game apparatus, a first attachment device is a program cartridge (more particularly, a game cartridge) having stored therein a predetermined application program (more particularly, a game program), and a second attachment device is a cartridge (referred to as an antenna cartridge) having a function capable of receiving broadcasting (more particularly, a digital broadcasting receiving function). The present embodiment is also applicable to other apparatuses other than the above-described game apparatus and the above-described cartridges. For example, the electronic apparatus into which the attachment device is mounted may be replaced with a portable terminal such as a portable phone and a PDA. Further, the first attachment device may be a storage medium for storing data generated in the electronic apparatus, and the second attachment device may be a cartridge for causing the electronic apparatus to expand its capabilities in addition to the capability of receiving the digital broadcasting.

(General Description of Game Apparatus and Cartridge)

Figure 1:
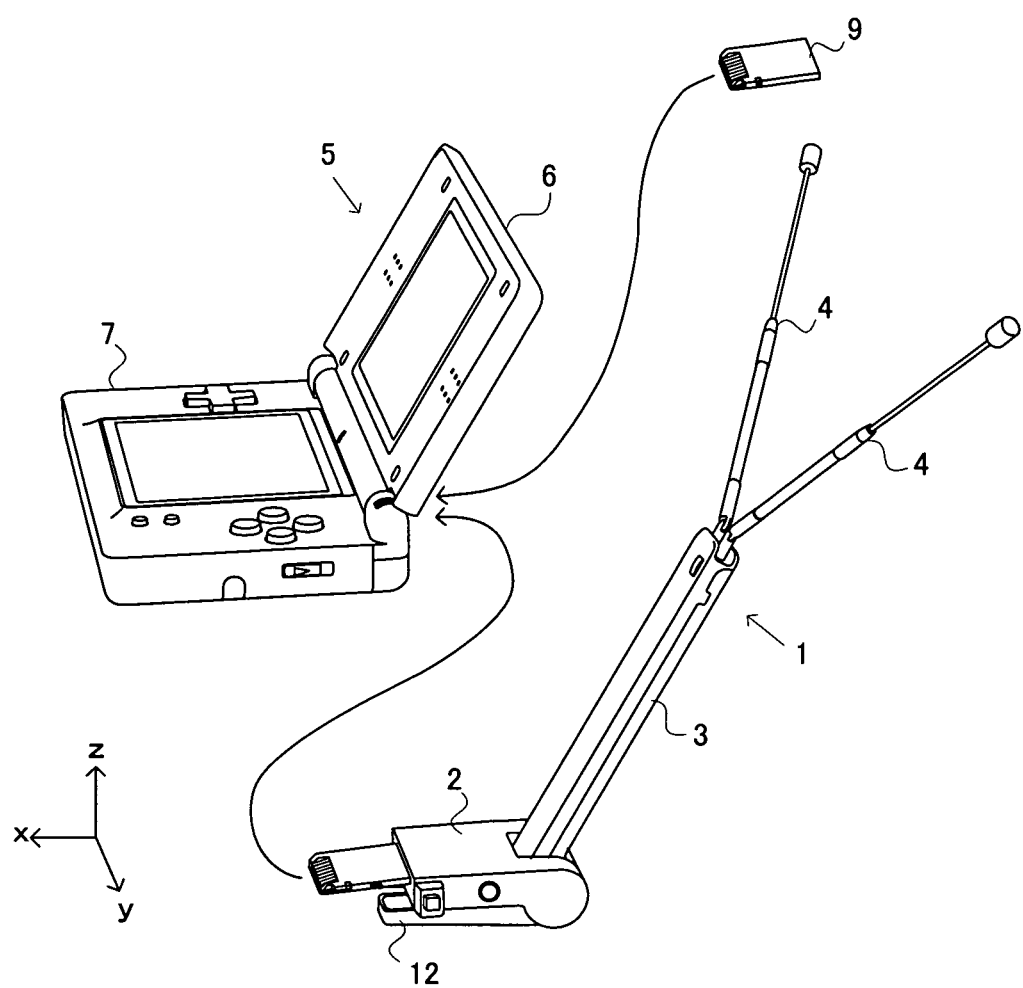
FIG. 1 is a diagram showing an outer appearance of a game apparatus and respective cartridges.
Figure 2:
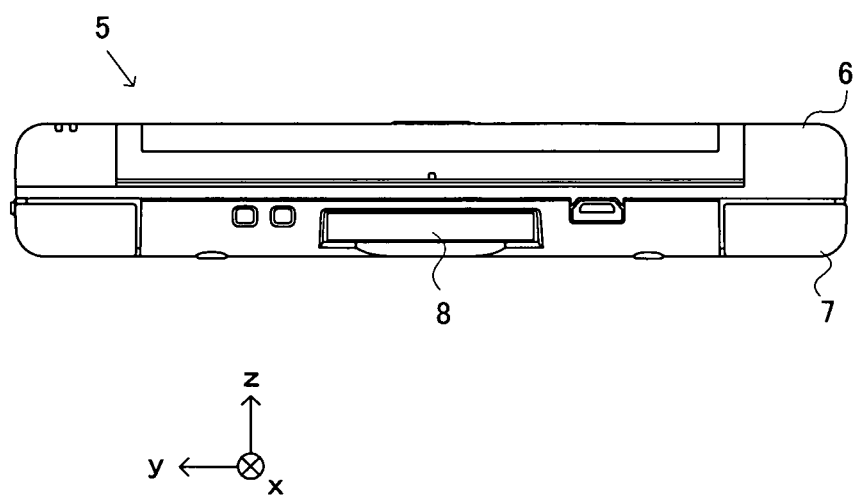
FIG. 2 is a plan view showing an end surface of a game apparatus 5, where an insertion slot is arranged.
Figure 3:
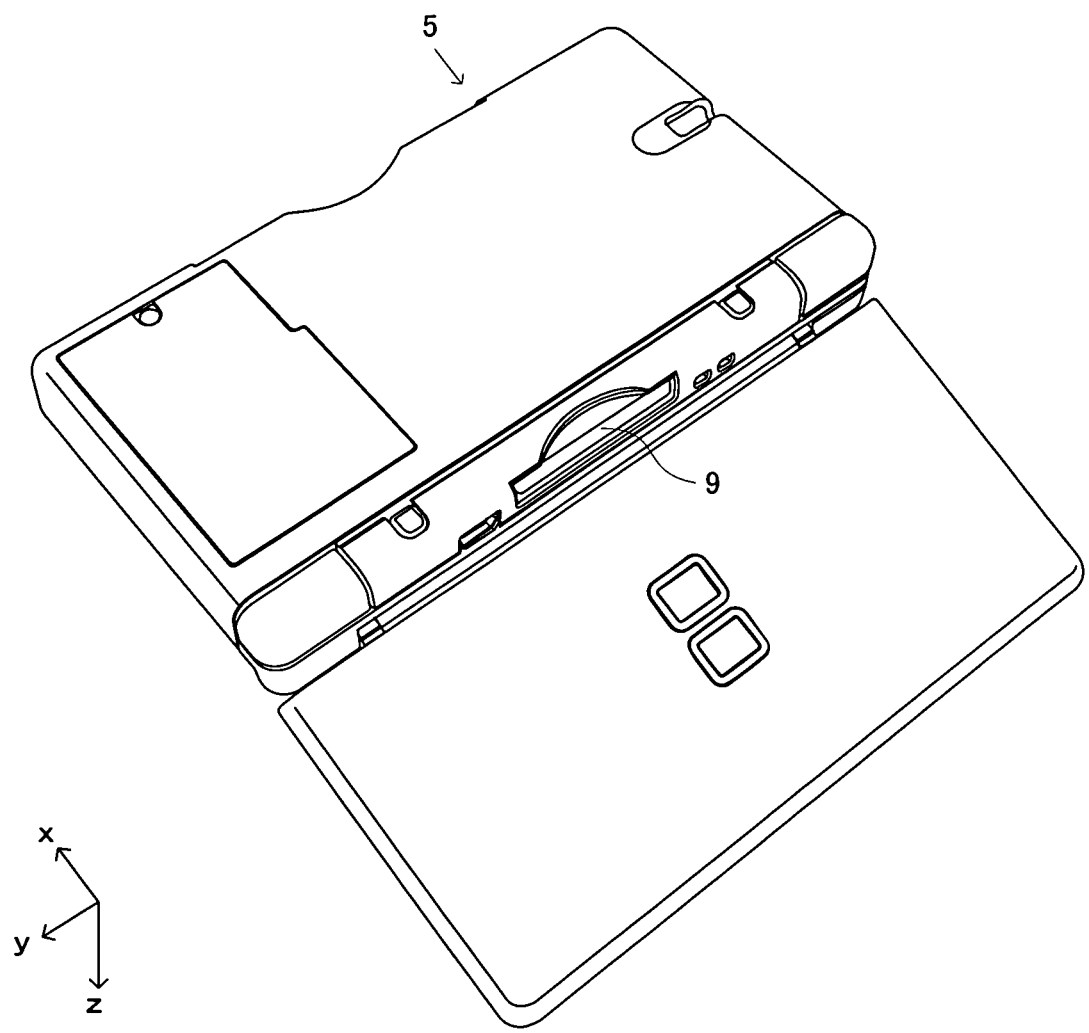
FIG. 3 is a diagram showing the game apparatus 5 having a game cartridge 9 mounted therein.

With reference to FIGS. 1 to 3, a general configuration of the game apparatus and the cartridge will be described, respectively. FIG. 1 is a diagram showing an outer appearance of each of the game apparatus, the game cartridge, and the antenna cartridge. The game apparatus 5 shown in FIG. 1 includes display devices (two display devices in FIG. 1), buttons and the like. A game cartridge 9 is mounted into the game apparatus 5, and then a game program stored in the game cartridge 9 is executed, whereby a player (user) is able to play a game. Further, the game apparatus 5 is capable of receiving a broadcast signal so as to allowing the user to view a broadcast when the antenna cartridge 1 is mounted therein. In the present embodiment, the game apparatus 5 is a fold-type hand-held game apparatus, and has two housings, that is, an upper housing 6 and a lower housing 7. Each of the housings 6 and 7 is of a rectangular planar shape. One side of the housing 6 is connected to one side of the housing 7 such that both of the housings 6 and 7 are rotatable about the connected one sides. FIG. 2 is a plan view showing an end surface of the game apparatus 5, where an insertion slot is arranged. FIG. 2 shows the game apparatus 5 in a state where the two housings 6 and 7 are folded together, and shows the end surface on which the housings 6 and 7 are connected to each other. As shown in FIG. 2, on the end surface of the game apparatus 5, the insertion slot 8 is arranged so as to selectively mount therein the game cartridge 9 or the antenna cartridge 1. The insertion slot 8 may be arranged at any position.

Figure 4:
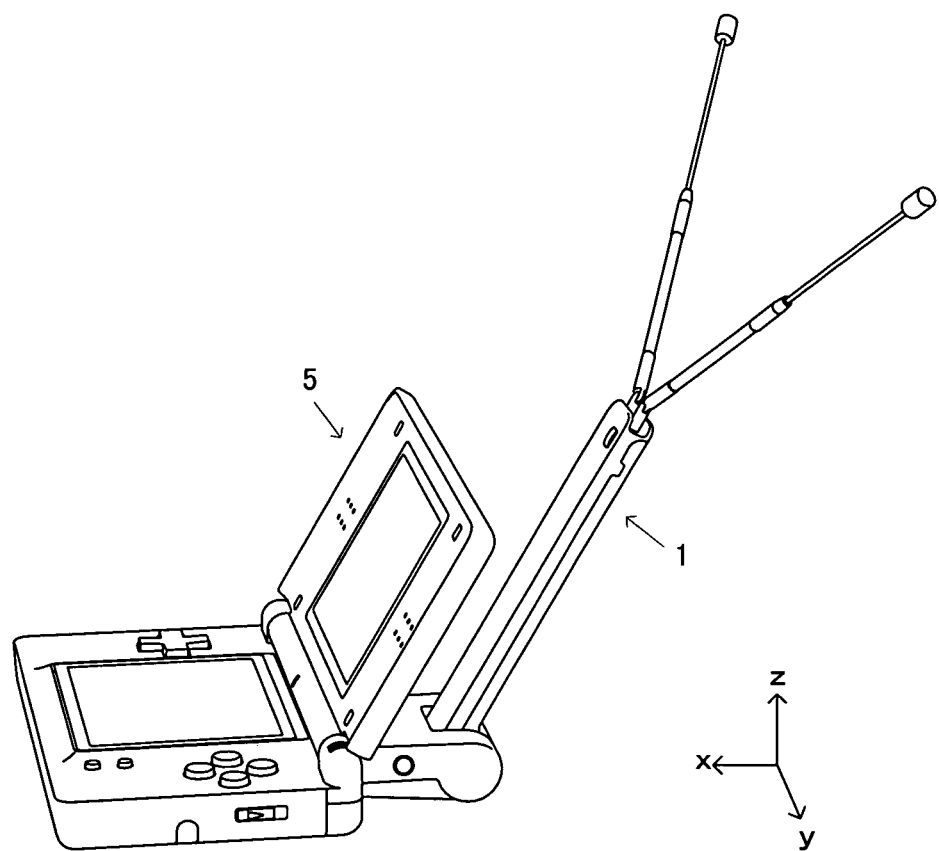
FIG. 4 is diagram showing the game apparatus 5 having an antenna cartridge 1 mounted therein.

Each of the game cartridge 9 and the antenna cartridge 1 shown in FIG. 1 is the attachment device to be mounted into the game apparatus 5. The game cartridge 9 has a storage medium inside its housing, the storage medium having a game program stored therein. FIG. 3 is a perspective view showing the game apparatus 5 having the game cartridge 9 mounted therein. As shown in FIG. 3, the game cartridge 9 is mountable into the game apparatus 5 such that a (substantially) whole of the game cartridge 9 is accommodated inside the insertion slot 8. On the other hand, antenna cartridge 1 has a main body part 2 whose front edge is mountable into the insertion slot 8 of the game apparatus 5. FIG. 4 is a perspective view showing the game apparatus having the antenna cartridge 1 mounted therein. As shown in FIG. 4, the antenna cartridge 1 has a portion which protrudes from the insertion slot 8 while the antenna cartridge 1 is mounted in the game apparatus 5. The main body part 2 has a housing (a housing 11 shown in FIG. 6), and further has a predetermined circuit board for processing a digital broadcast signal, the circuit board being situated inside the housing. Although details will be described later, the main body part 2 of each of the game cartridge 9 and the antenna cartridge 1 is detachably inserted into the insertion slot 8. When the user is to play a game using the game apparatus 5, as shown in FIG. 3, the user may insert the game cartridge 9 into the game apparatus 5. When the user is to view a digital broadcast using the game apparatus 5, the user may insert the antenna cartridge 1 into the game apparatus 5, as shown in FIG. 3. The game cartridge 9 is inserted into the insertion slot 8, whereby it is possible to cause the game apparatus 5 to execute the game program, whereas the antenna cartridge 1 is inserted thereinto, whereby it is possible to cause the game apparatus 5 to receive the digital broadcasting.

The antenna cartridge 1 includes an antenna housing part 3 and an antenna 4. To one edge of the main body part 2, one end of the antenna housing part 3 is rotatably connected. The antenna housing part 3 is configured with a tubular material and has a hollow inside thereof so as to accommodate the antenna 4. The antenna 4 is connected to the other end of the antenna housing part 3. The antenna 4 receives digital broadcasting, and in the present embodiment, the antenna cartridge 1 has two antennas 4. Each of the antennas 4 can be moved at any angle relative to the antenna housing part 3. Further, a connection part between the antenna housing part 3 and the antenna 4 is slidable along the hollow inside the tubular antenna housing part 3. Therefore, the antenna housing part 3 is capable of accommodating each of the antennas 4 therein-side. Each of the antennas 4 is housed inside the antenna housing part 3, and the main body part 2 and the antenna housing part 3 are folded up by rotating the antenna housing part 3, whereby the antenna cartridge 1 is downsized when the same is not used.

(Configuration of Game Cartridge 9 and Antenna Cartridge 1 of Main Body Part 2)

Figure 5:
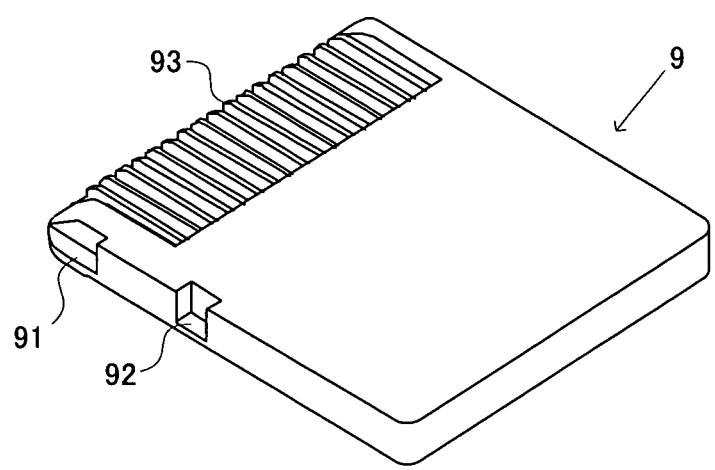
FIG. 5 is a diagram showing, in detail, a configuration of the game cartridge 9.
Figure 5:
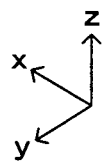
Figure 6:
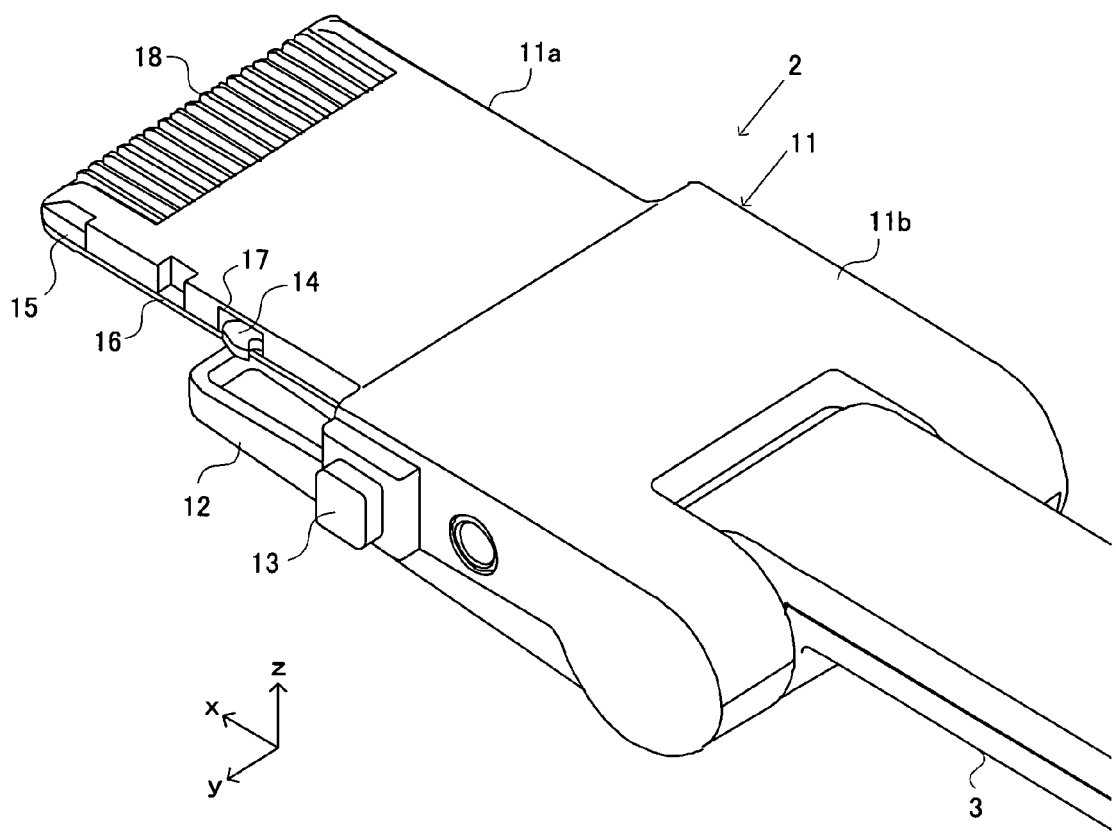
FIG. 6 is a diagram showing, in detail, a configuration of a main body part 2 of the antenna cartridge 1.

With reference to FIGS. 5 to 9, a configuration of each of the game cartridge 9 and the main body part 2 of the antenna cartridge 1 will be described. FIG. 5 is a diagram showing, in detail, a configuration of the game cartridge 9. FIG. 6 is a diagram showing, in detail, a configuration of the main body part 2 of the antenna cartridge 1.

As shown in FIG. 5, the game cartridge 9 is of a planar shape having an upper surface (a surface at a z-axis positive side shown in FIGS. 5 and 6) and a lower surface, and is slightly smaller in size than the insertion slot 8 of the game apparatus 5. As shown in FIG. 3, when the game cartridge 9 is inserted into the game apparatus 5, the whole thereof is inserted inside the insertion slot 8. The game cartridge 9 has a plurality of connection terminals 93 for causing the game cartridge 9 and the game apparatus 5 to be electrically connected to each other. The connection terminals 83 are provided at a front edge on the upper surface (an edge to be inserted into the insertion slot 8) of the housing of the game cartridge 9.

Further, at one side (a side at a y-axis positive side in FIG. 5) on the upper surface of the game cartridge 9, a first recessed portion 91 and a second recessed portion 92 are formed. The first recessed portion 91 is formed at a front edge of the one side. The second recessed portion 92 is formed at a rear side of the first recessed portion 91. The first recessed portion 91 is open upward and laterally, and the second recessed portion 92 is also open in the same manner as the first recessed portion 91.

As shown in FIG. 6, the main body part 2 of the antenna cartridge 1 has a housing 11 and a protruding portion 12. A rear edge (an edge at an x-axis negative side shown in FIG. 6) of the housing 11 is rotatably connected to the antenna housing part 3, thereby supporting the antenna housing part 3. Further, the housing 11 of the antenna cartridge 1 has an insertion part 11a inserted inside the insertion slot 8, and a non-insertion part 11b protruding from the insertion slot 8. Hereinafter, a side of the main body part 2 (the x-axis negative side shown in FIG. 6), the side being connected to the antenna housing part 3, is referred to as a rear side, and a side opposite thereto (an x-axis positive side shown in FIG. 6) is referred to as a front side, for the sake of description of the same.

The insertion part 11a of the antenna cartridge 1 and the game cartridge 9 are of a common shape except for a hook described later. Specifically, the insertion part 11a is of the planar shape having an upper surface (a surface facing the z-axis positive side shown in FIGS. 5 and 6) and a lower surface, and is slightly smaller in size than the insertion slot 8 of the game apparatus 5. Therefore, when the game cartridge 9 is inserted into the game apparatus 5, the whole thereof is inserted inside the insertion slot 8, whereas when the antenna cartridge 1 is inserted into the game apparatus 5, only the insertion part 11a is inserted inside the insertion slot 8, and the remaining part protrudes from the insertion slot 8. Further, the antenna cartridge 1 has a plurality of connection terminals 18 for causing the antenna cartridge 1 and the game apparatus 5 to be electrically connected to each other. The connection terminals 18 are provided at a front edge on the upper surface of the insertion section 11a. The non-insertion section 11b represents a part of the housing 11 other than the insertion section 11a.

Further, at one side on the upper surface (a side at the y-axis positive side in FIG. 6) of the insertion part 11a of the antenna cartridge 1, a first recessed portion 15 and a second recessed portion 16 are formed at the same positions, respectively, as the recessed portions 91 and 92 formed in the game cartridge 9. That is, each of the recessed portions 15 and 16 are formed at the same side as the recessed portions 91 and 92. The first recessed portion 15 is formed at a front edge of the one side, and the second recessed portion 16 is formed at a rear side of the first recessed portion 15. In the same manner as the game cartridge 9, the first recessed portion 15 and the second recessed portion 16 in the antenna cartridge 1 are each open upward and laterally.

Although details will be described later, each of the recessed portions 15, 16, 91, and 92 formed as above described is designed to cause a slide member (a slide member 41 shown in FIG. 8), which is provided inside the insertion slot 8, to move (slide) integrally with the cartridge 1 when the game cartridge 9 or the antenna cartridge 1 is inserted into the insertion slot 8 of the game apparatus 5.

The antenna cartridge 1 has a device latch hook (hereinafter, simply referred to as a hook) 14. The hook 14 is a member for latching the insertion section 11a, which is inserted into the insertion slot 8, onto the game apparatus 5. The hook 14 is housed inside the housing 11, and an end thereof is connected to a spindle situated inside the housing 11. Although details will be described later, the hook 14 is rotatably connected to the housing 11. A hook hole 17 is provided on one side surface (a side surface at the y-axis positive side shown in FIG. 6) of the insertion section 11a. The hook hole 17 is provided at the same side surface as the recessed portions 15 and 16. The hook hole 17 is formed at a further rear side of the second recessed portion 16. As shown in FIG. 6, a latch portion at a tip end of the hook 14 (a latch portion 23 shown in FIG. 7) protrudes outward from the hook hole 17 of the insertion section 11a. Further, a button 13 is provided on the one side surface of the housing 11, the one side surface having the hook hole 17 provided thereon. The button 13 is fixed at a position such that the button 13 stays outside the insertion slot 8 when the non-insertion section 11b, i.e., the antenna cartridge 1, is mounted into the insertion slot 8. The button 13 causes the hook 14 to rotate such that the hook 14 is released from a latched state (more specifically, such that the latch portion of the hook 14 is housed inside the insertion section 11a). Hereinafter, with reference to FIGS. 7 and 8, a configuration of the hook 14 will be described.

Figure 7:
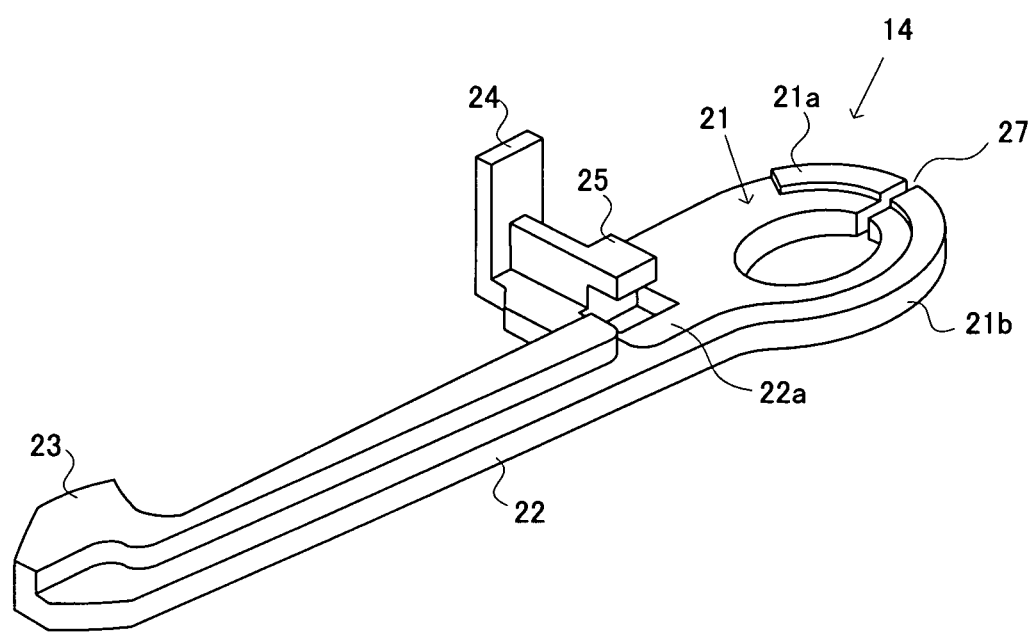
FIG. 7 is a perspective view of a hook 14.

FIG. 7 is a perspective view of the hook 14. As shown in FIG. 7, the hook 14 includes a ring portion 21, an arm 22, the latch portion 23, a pressing portion 24, and a protruding portion 25. In the present embodiment, each of the portions 21 to 25 included in the hook 14 are molded and configured in an integrated manner. As shown in FIG. 7, the ring portion 21 is formed at one end of the hook 14, and the latch portion 23 is formed the other end thereof. The ring portion 21 and the latch portion 23 are connected to each other with the arm 22. Further, the hook 14 is made from an elastic material (for example, a stiff resin), and may be alternatively made from a PA, an ABS, a PC, a POM, a PP and the like. Preferably, the hook may be made from nylon containing glass fiber. In the present embodiment, the hook 14 is made from nylon 6 containing the glass fiber.

As shown in FIG. 7, the ring portion 21 is formed at the one end of the hook 14. The ring portion 21 is designed to cause the hook 14 to be rotatably connected to the housing 11. The ring portion 21 has two forearm portions 21a and 21b which are respectively extending from a connecting portion 22a (an end of the arm 22 on the ring portion 21 side) which connects between the arm 22 and the forearm portions. The two forearm portions 21a and 21b of the ring portion 21 grasp the spindle, which is to be described later, whereby the ring portion 21 is rotatably connected to the spindle. In the present embodiment, each of the forearm portions 21a and 21b are configured such that an interval (a slit 27), which is smaller than a diameter of the spindle, is formed between a tip end of the forearm portion 21a and a tip end of the forearm portion 21b. In other words, in the present embodiment, the ring portion 21 is shaped such that a cut, which intersects the ring portion from its inner circumference to its outer circumference, is formed. In FIG. 7, the cut corresponds to the slit 27 which has a predetermined interval. However, in another embodiment, the cut (slit) does not necessarily have the interval. The slit 27 is formed at a side opposite to the connecting potion 22a between the ring portion 21 and the arm 22. As shown in FIG. 7, in order to enhance the strength of the ring portion 21, and also in order to secure a space for locating a spring 32, which is to be descried later, on the inner circumference side, the ring portion 21 is configured such that an outer circumference portion of the forearm portions of the ring portion 21 is thicker than an inner circumference portion thereof, the tip ends of the forearm portions being situated so as to sandwich the slit 27.

At the other end of the hook 14, the latch portion 23 of a hook shape is formed. The latch portion 23 is designed to cause the antenna cartridge 1 to latch on a predetermined portion in the insertion slot 8 of the game apparatus 5, when the antenna cartridge 1 is inserted into the game apparatus 5. As shown in FIG. 7, in order to make the latch portion 23 stronger than the ring portion 21, the latch portion 23 is made thicker than the ring portion 21. A part of the arm 22 is configured so as to be as thick as the latch portion 23, and the remaining part is configured to be thinner than the part of the arm 22. Such configuration is designed to prevent the arm 22 from interfering with other component parts when the arm 22 moves, and also designed to maintain the strength of the part of the arm 22, the portion not interfering with the other component parts.

The pressing portion 24 and the protruding portion 25 are provided to the connecting portion 22a between the ring portion 21 and the arm 22. The pressing portion 24 is situated so as to abut against the button 13 when the hook 14 is connected to the housing 11. The protruding portion 25 is provided so as to latches a spring (the spring 32 shown in FIG. 8) thereonto, the spring being described later.

Figure 8:
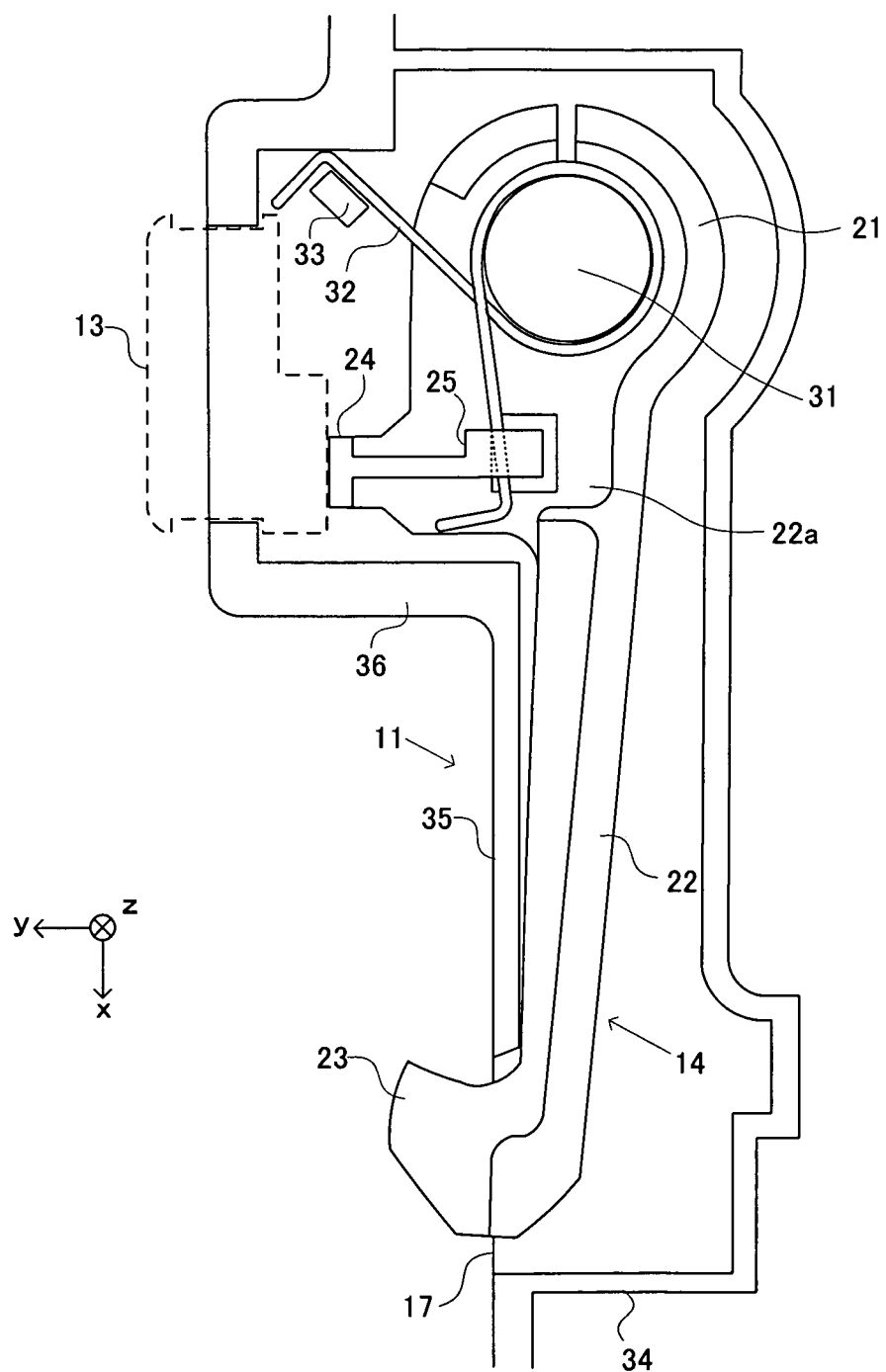
FIG. 8 is a diagram showing an internal configuration of a part of a housing 11, the portion to which the hook 14 is provided.

FIG. 8 is a diagram showing an internal configuration of a part of the housing 11, the portion to which the hook 14 is provided. As shown in FIG. 8, the housing 11 includes thereinside a spindle 31, the spring 32, the protruding portion 33, and a partition wall 34. The spindle 31 is formed at a predetermined position inside the housing 11 (for example, being molded integrally with the housing 11), and is of a cylindrical shape. The hook 14 is rotatably pivoted by the spindle 31. That is, the hook 14 is connected to the spindle 31 such that the spindle 31 is fitted into a hole of the ring portion 21. Further, the spindle 31 pivots the hook 14 such that the pressing portion 24 of the hook 14 abuts against the button 13, and such that the latch portion 23 of the hook 14 is protrusible outward from the hook hole 17 of insertion section 11a.

The spring 32 is a torsion coil spring, and has a ring portion situated at a central portion thereof. The diameter of the ring portion is substantially the same as that of the spindle 31. The ring portion of the spring 32 is fitted around the spindle 31. One end of the spring 32 abuts against the protruding portion 33 formed inside the housing 11, and the other end of the spring is fixed so as to abut against the protruding portion 25 of the hook 14 (see FIG. 8). As shown in FIG. 8, the spring 32 biases the hook 14 such that the latch portion 23 of the hook 14, which is pivoted by the spindle 31, protrudes outward from the hook hole 17 of the insertion section 11a. Therefore, under a state where the hook 14 and the spring 32 are fixed to the housing 11, the hook 14 is maintained in a state where the arm 22 thereof abuts against an outside wall 35 of the housing 11, and the latch portion 23 thereof protrudes outward from the hook hole 17 of the insertion section 11a (see FIG. 8).

Figure 9:
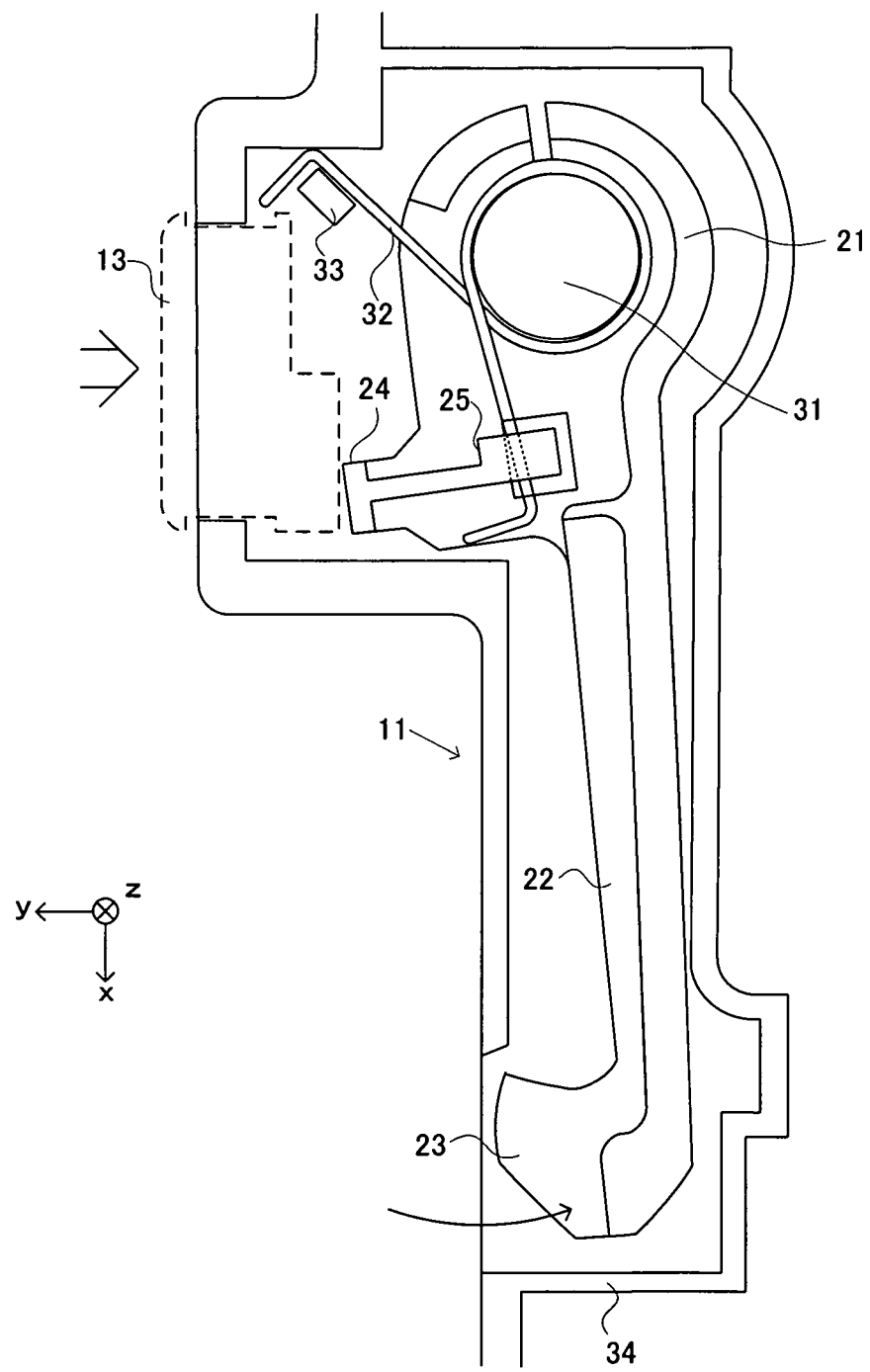
FIG. 9 is a diagram showing a state where a button 13 is pressed from a state shown in FIG. 8.

As above described, under the state where the latch portion 23 of the hook 14 protrudes outward from the hook hole 17 of the insertion section 11a, an underside of the button 13 abuts against the pressing portion 24. Therefore, by pressing the button 13, the pressing portion 24 is pressed, and then the hook 14 rotates. FIG. 9 is a diagram showing a state where the button 13 is pressed from a state shown in FIG. 8. As shown in FIG. 9, when the button 13 is pressed, the hook 14 rotates, and the latch portion 23 is housed inside the insertion section 11a. In this case, the spring 32 is elastically deformed. When the button 13 is released from being pressed, a bias force of the spring 32 causes the hook 14 to return to the state where the latch portion 23 protrudes outward from the hook hole 17 of the insertion section 11a.

With reference back to FIG. 8, ahead of the latch portion 23, as viewed from the side of the arm 22, a partition wall 34 is provided. At the x-axis positive side of the connecting portion 22a between the ring portion 21 and the arm 22, an outside wall 36 of the housing 11 is provided. Although details will be described later, when a tensile force to pull the ring portion 21 is applied to the latch portion 23, the ring portion 21 may be deformed (more particularly, the ring portion will be deformed so as to extend in an insertion/ejection direction) since the above-described slit 27 is formed. Therefore, when the tensile force is applied, the ring portion 21 is deformed, and thus the hook 14 slightly moves toward the front side of the main body part 2 (the x-axis positive side) (see FIG. 17 to be described later). The partition wall 34 and the outside wall 36 are formed to prevent the hook 14 from moving to an extent that the ring portion 21 is disengaged from the spindle 31 in the above-described case. That is, even when the tensile force which pulls the ring portion 21 is significantly strong, the partition wall 34 prevents the hook 14 from moving significantly, and thus it is possible to prevent the ring portion 21 from being deformed to a large extent. Further, even when the force pulling the ring portion 21 is significantly strong, the outside wall 36 prevents the hook 14 from moving considerably, and thus it is also possible to prevent the ring portion 21 from being deformed to a large extent.

With reference back to FIG. 6, to a lower surface (a surface at a z-axis negative side shown in FIG. 6) of the housing 11 of the antenna cartridge 1, the protruding portion 12 is provided in a fixed manner so as to be distanced from the insertion section 11a in the z-axis negative direction. That is, there is an air gap between the insertion section 11a and the protruding portion 12 in the z-axis direction, and a portion outside the insertion slot 8 is fitted into the air gap. When the antenna cartridge 1 is inserted into the insertion slot 8, the protruding portion 12 is connected to the portion outside the insertion slot 8, i.e., a portion other than the insertion section 11a. The protruding portion 12 is connected to the portion other than the insertion section 11a so as to protrude forward (toward the x-axis positive direction shown in FIG. 6). When the antenna cartridge 1 is inserted into the game apparatus 5, the protruding portion 12 abuts against an outside surface (a surface which faces outside when the game apparatus 5 is folded) of the lower housing 7 of the game apparatus 5. The protruding portion 12 is situated so as to fix and stabilize the antenna cartridge 1 inserted in the game apparatus 5. Since the whole of the game cartridge 9 is inserted inside the insertion slot 8, the protruding portion 12 is not necessary therefor.

(Configuration of Insertion Slot 8)

Figure 10:
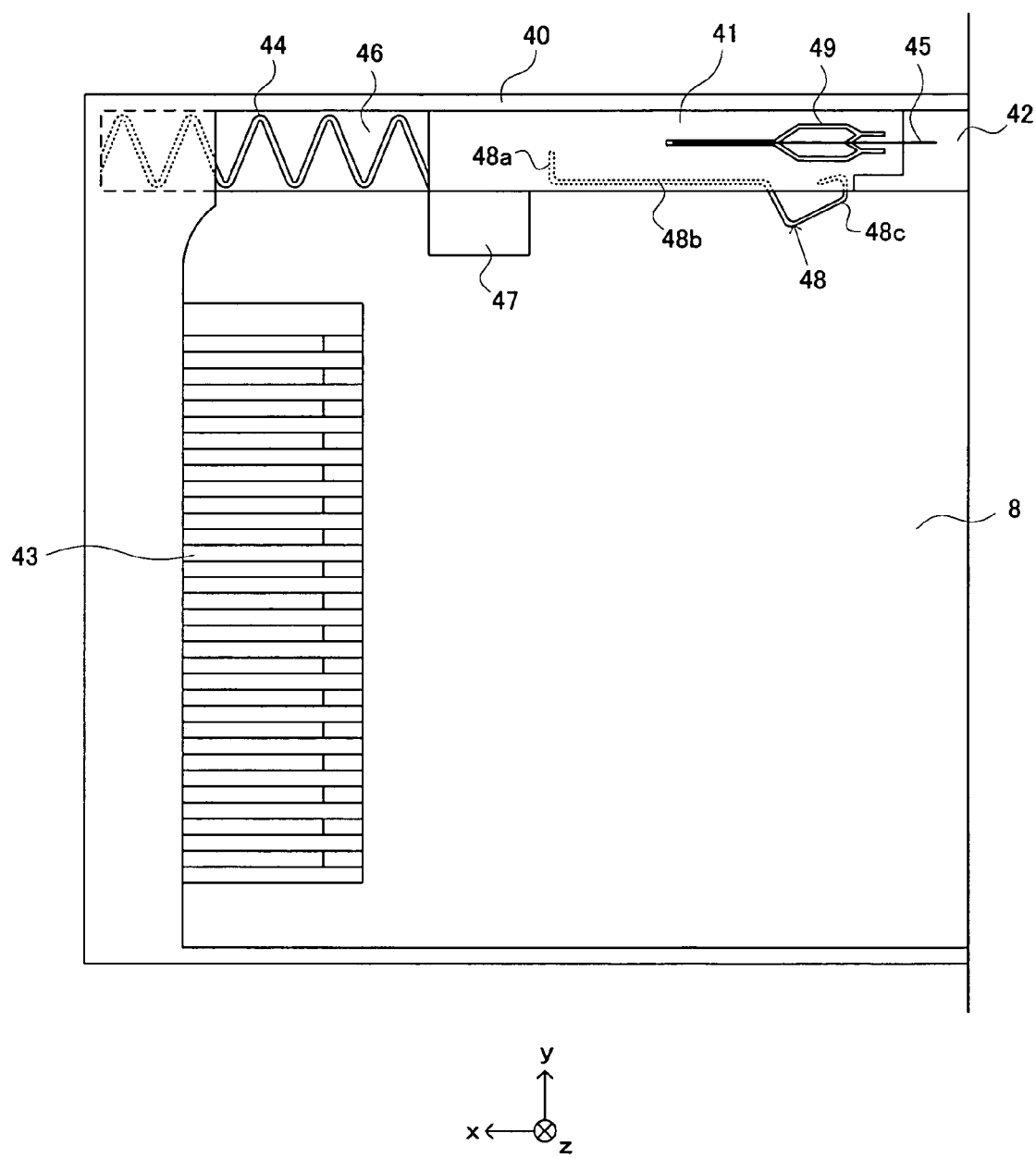
FIG. 10 is a plan view showing a configuration of an insertion slot 8 and its surrounding portion.
Figure 11:
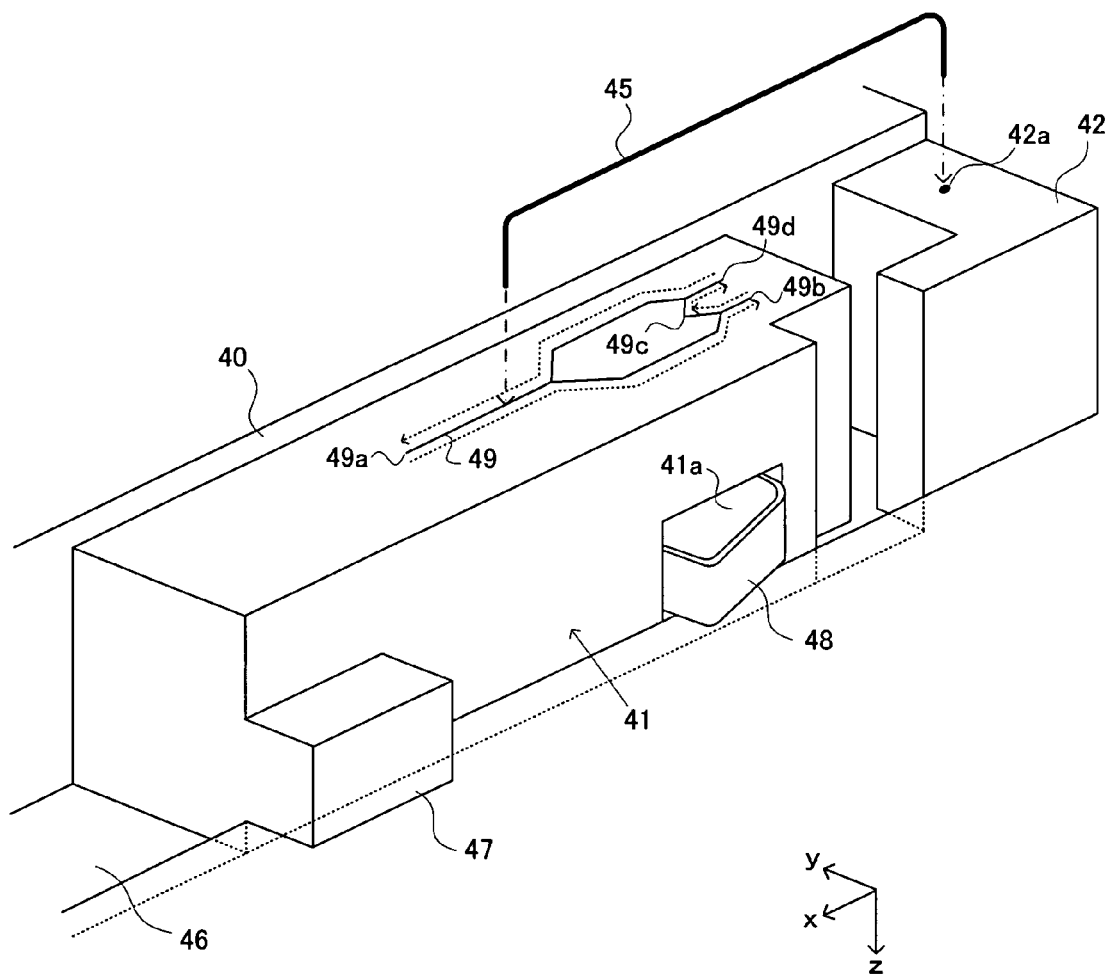
FIG. 11 is a perspective view showing a configuration of a slide member and its surrounding portion provided in the insertion slot 8.

Next, with reference to FIGS. 10 and 11, an internal configuration of the insertion slot 8 of the game apparatus 5 will be described. FIG. 10 is a plan view showing a configuration of the insertion slot 8 and its surrounding portion. FIG. 11 is a perspective view showing a configuration of the slide member and its surrounding portion provided in the insertion slot 8. FIGS. 10 and 11 are each a diagram showing an inside of the insertion slot 8 as viewed from a lower side (a z-axis negative side) toward an upper side in a state where a lower surface of the lower housing is removed. In the following description of the inside of the insertion slot 8, a "near side" represents a side close to the insertion slot 8 (the x-axis negative side shown in FIG. 10), and a "far side" represents a side distanced from the insertion slot 8 (the x-axis positive side shown in FIG. 10).

As shown in FIG. 10, an inside wall 40, the slide member 41, a pin supporting member 42, the connection terminals 43, a spring 44, and a pin 45 are provided to the inside of the insertion slot 8. The connection terminals 43 are designed to electrically connect between the game apparatus 5 and each of the cartridges (hereinafter the game cartridge 9 and the antenna cartridge 1 are collectively referred to as "cartridge" or "cartridges"). The connection terminals 43 are provided at a far side end on an upper surface (the surface at the z-axis positive side) of the insertion slot 8.

At one side edge portion (an edge portion at the y-axis positive side in FIG. 10) on the upper surface of the insertion slot 8, a groove 46 is formed in a direction from the near side to the far side of the insertion slot 8. A part of the slide member 41 is housed and situated in the groove 46, and the slide member 41 is engaged with the inside wall 40 so as to be slidable along the groove 46 (see FIG. 11). Therefore, the slide member 41 is movable deep inside the insertion slot 8 (the x-axis direction shown in the diagram). The pin supporting member 42 is provided at the near side of the groove 46. The pin supporting member 42 is provided to an opening portion (an edge portion at the near side) of the insertion slot 8 in a fixed manner. The pin supporting member 42 has a function of limiting a movement of the slide member 41 to the near side and also has a function of supporting the pin 45. Both of the functions will be described later. On the other hand, an edge portion, at the far side, of the slide member 41 is firmly fixed to one end of the spring 44. The spring 44 is a compression coil spring, and the other end of the spring 44 is firmly fixed to a surface of the inside wall 40 at the far side. The spring 44 biases the slide member 41 in a direction from the far side to the near side of the insertion slot 8. In FIG. 11, the spring 44 is omitted such that the diagram can be viewed easily. With the above-described configuration, the slide member 41 receives, from the spring 44, a force in a direction from the far side to the near side of the insertion slot 8. Therefore, in a normal state (when the cartridge 1 is not inserted in the insertion slot 8), the slide member 41 is situated at a position abutting against the pin supporting member 42, as shown in FIG. 10.

Further, the pin 45 is an inverted U-shaped bar member as shown in FIG. 11. One end of the pin 45 is inserted into a pin connection hole 42a which is formed on a lower surface (a surface at the z-axis negative side) of the pin supporting member 42. Accordingly, the pin 45 is engaged with the pin supporting member 42 so as to be rotatable about an axis in an up-down direction (the z-axis). On the other hand, on a lower surface of the slide member 41 (a surface at the z-axis negative side), a heart cam 49 is provided. The pin 45 is fixed to the pin supporting member 42 such that the other end of the pin 45 is situated inside a cam groove of the heart cam 49 (see chain line arrows shown in FIG. 11). When the slide member 41 moves along the groove 46, the other end of the pin 45 moves unidirectionally along a first end 49a, a second end 49b, a sharp angle portion 49c, a third end 49d, and the first end 49a in this order (see dotted line arrows shown in FIG. 11). A depth of the cam groove of the heart cam 49 is adjusted such that the other end of the pin 45 moves as above described.

Further, the slide member 41 has a projecting portion 47 and a protruding member 48. The projecting portion 47 is formed on a side of the slide member 41, the side being opposite to that abutting against the inside wall 40. The projecting portion 47 is shaped so as to be engaged with the first recessed portion 15 or the first recessed portion 91 of the cartridge. The protruding member 48 is made from metal or the like, and is formed by folding a planar material. The protruding member 48 has a fixing portion 48a, a shank portion 48b, and a protruding portion 48c. The fixing portion 48a is one end of the protruding member 48, and firmly fixed to the slide member 41 in an inside thereof. One end of the shank portion 48b is connected to the fixing portion 48a, and the other end thereof is connected to the protruding portion 48c. The protruding portion 48c protrudes outward from a hole 41a provided in the slide member 41. A size of the protruding portion 48c is such that the protruding portion 48c is housed in the second recessed portion 16 or 92 of the cartridge. The protruding member 48 is firmly fixed to the slide member 41 such that the protruding portion 48c protrudes to a side at which the projecting portion 47 is formed (that is, the side of the slide member 41, the side being opposite to that abutting against the inside wall 40). Only the fixing portion 48a of the protruding member 48 is fixed to the slide member 41. Therefore, when a force is applied to the protruding portion 48c so as to push the protruding portion 48c toward the inside of the slide member 41, the shank portion 48b is deformed (bent), and accordingly, the protruding portion 48c is housed inside the slide member 41.

Although details will be described later, with the above-described heart cam mechanism (the heart cam 49 and the pin 45), it is possible to stop the slide member 41, which is biased in the direction from the far side to the near side, at a predetermined position in the far side. Accordingly, when the cartridge 1 is inserted into a far side end of the insertion slot 8, the cartridge 1 can be mounted into the insertion slot 8. When the cartridge 1 is pushed into the far side end of the insertion slot 8 while the cartridge 1 is mounted in the insertion slot 8, the cartridge 1 can be ejected from the insertion slot 8 (FIGS. 12 to 16). In other words, the insertion slot 8 according to the present embodiment has a push-in/push-out insertion/ejection mechanism. The push-in/push-out insertion/ejection mechanism (a mechanism for causing the cartridge to perform an alternate operation) may be realized by using a rotating cam or a ratchet cam instead of the heart cam. The game cartridge 9 is pushed into the far side end of the insertion slot 8 in order to eject the cartridge. On the other hand, the antenna cartridge 1 needs be pushed into the far side end of the insertion slot 8 while the button 13 is being pressed.

(Operation when Antenna Cartridge 1 is Loaded)

Next, with reference to FIGS. 12 to 16, an operation of the main body part 2 of the cartridge 1 and operations of respective component parts provided in the insertion slot 8 of the game apparatus 5 will be described, when the cartridge 1 is inserted into the insertion slot 8 of the game apparatus 5. Each of FIGS. 12 to 16 shows a state where the insertion section 11a of the antenna cartridge 1 is inserted into the insertion slot 8. In the same manner as FIG. 10, each of FIGS. 12 to 16 shows an upper inside of the insertion slot 8 as viewed from a lower side (the z-axis negative side) in a state where the lower surface of the lower housing 7 is removed.

Figure 12:
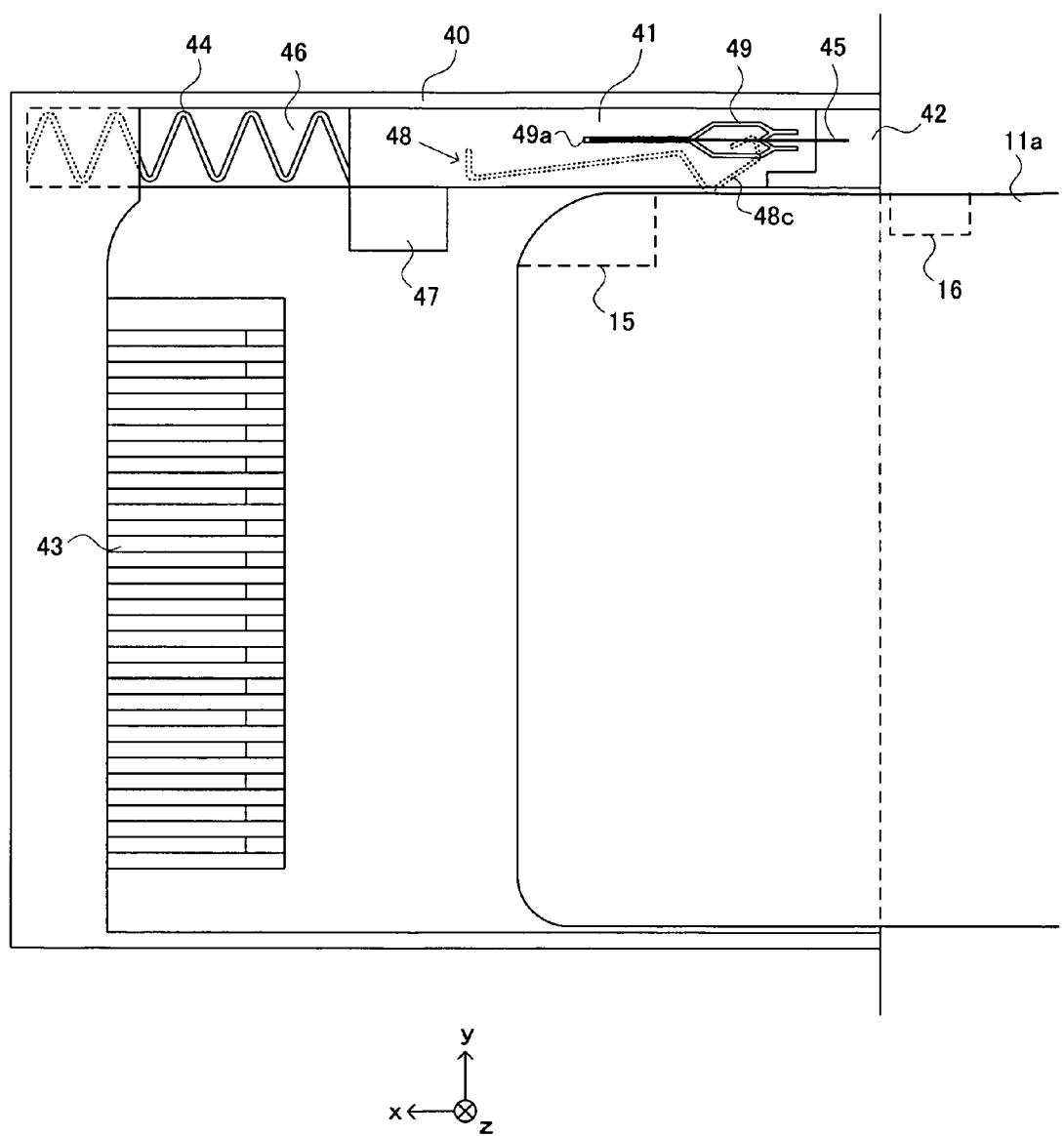
FIG. 12 is a diagram showing a state immediately after the insertion part 11a of the antenna cartridge 1 is inserted into the insertion slot 8.

FIG. 12 is a diagram showing a state immediately after the insertion section 11a of the antenna cartridge 1 is inserted into the insertion slot 8. As shown in FIG. 12, the antenna cartridge 1 is inserted into the insertion slot 8 such that the upper surface (a surface at the z-axis positive side) of the insertion section 11a faces the upper side of the insertion slot 8. In other words, the insertion section 11a of the main body part 2 is inserted such that the one side of the insertion section 11a, on which both of the recessed portions 15 and 16 are formed, faces one side of the insertion slot 8 on which the slide member 41 is provided. As shown in FIG. 12, when the insertion section 11a is inserted into the insertion slot 8, and a side surface of the insertion section 11a abuts against the protruding member 48, then the protruding portion 48c of the protruding member 48 is pushed by the side surface, and is consequently housed inside the slide member 41. In this case, elastic forces of the spring 44 and protruding member 48 are each designed so as not to cause the slide member 41 to move.

In the case of the game cartridge 9, immediately after the game cartridge 9 is inserted, components parts thereof operate in the same manner as those of the antenna cartridge 1 when the insertion part 11a thereof is inserted. That is, the game cartridge 9 is inserted such that the upper surface thereof (the surface at the z-axis positive size) faces the upper surface of the insertion slot 8. Further, when the game cartridge 9 is inserted into the insertion slot 8, and a side surface of the game cartridge 9 abuts against the protruding member 48, then the protruding portion 48c of the protruding member 48 is pushed by the side surface and consequently housed inside the slide member 41.

Figure 13:
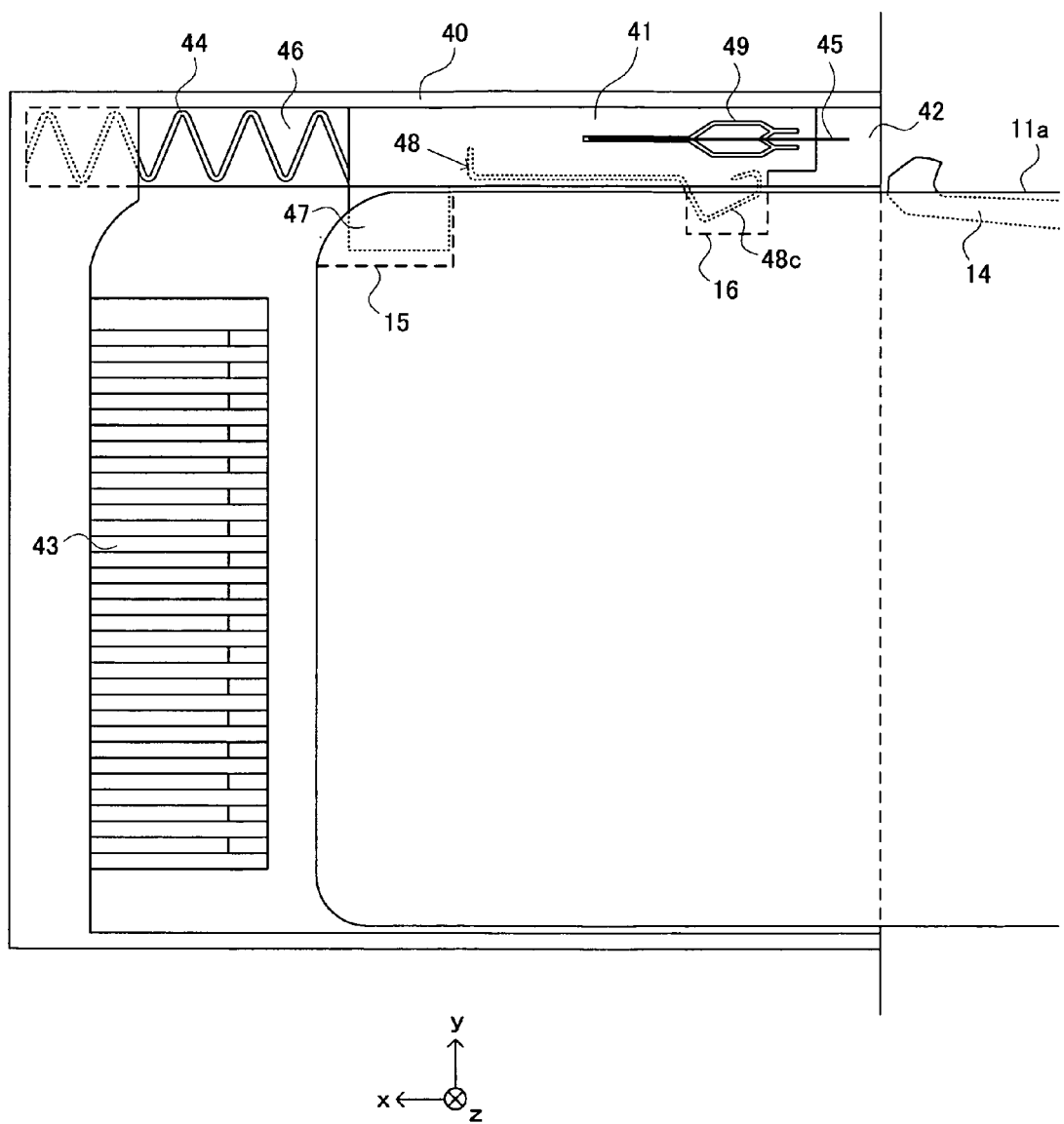
FIG. 13 is a diagram showing a state where the insertion part 11a of the antenna cartridge 1 is inserted deeper inside than the state shown in FIG. 12.

FIG. 13 is a diagram showing a state where the insertion section 11a of the antenna cartridge 1 is inserted deeper inside than the state shown in FIG. 12. As shown in FIG. 13, when the insertion section 11a of the antenna cartridge 1 is inserted deeper into the insertion slot 8, the first recessed portion 15 formed on the insertion section 11a and the projecting portion 47 formed on the slide member 41 are engaged with each other. That is, a rear side surface (at the x-axis negative side shown in the diagram) of the first recessed portion 15 abuts against a near side surface (at the x-axis negative side shown in the diagram) of the projecting portion 47. Therefore, when the insertion section 11a of the antenna cartridge 1 is inserted further deeper into the far side of the insertion slot 8 than the state shown in FIG. 13, the antenna cartridge 1 moves integrally with slide member 41. An interval between the first recessed portion 15 and the second recessed portion 16 is designed so as to be equal to an interval between the projecting portion 47 and the protruding portion 48c. Therefore, under a state where the first recessed portion 15 is engaged with the projecting portion 47, the protruding portion 48c is inserted inside the second recessed portion 16 (see FIG. 13).

In the case where the game cartridge 9 is inserted, in the same manner as the antenna cartridge 1, each of the recessed portions 91 and 92 of the game cartridge 9 and the projecting portion 47 and the protruding portion 48c of the slide member 41 cause the game cartridge 9 to move integrally with the slide member 41. That is, when the game cartridge 9 is inserted deeper into the far side of the insertion slot 8, the first recessed portion 91 formed in the game cartridge 9 is engaged with the projecting portion 47 formed in the slide member 41, as shown in FIG. 13. Therefore, when the game cartridge 9 is inserted further deeper into the far side of the insertion slot 8, the slide member 41 moves integrally with the game cartridge 9. Further, when the first recessed portion 91 is engaged with the projecting portion 47, the protruding portion 48c is inserted inside the second recessed portion 92.

Figure 14:
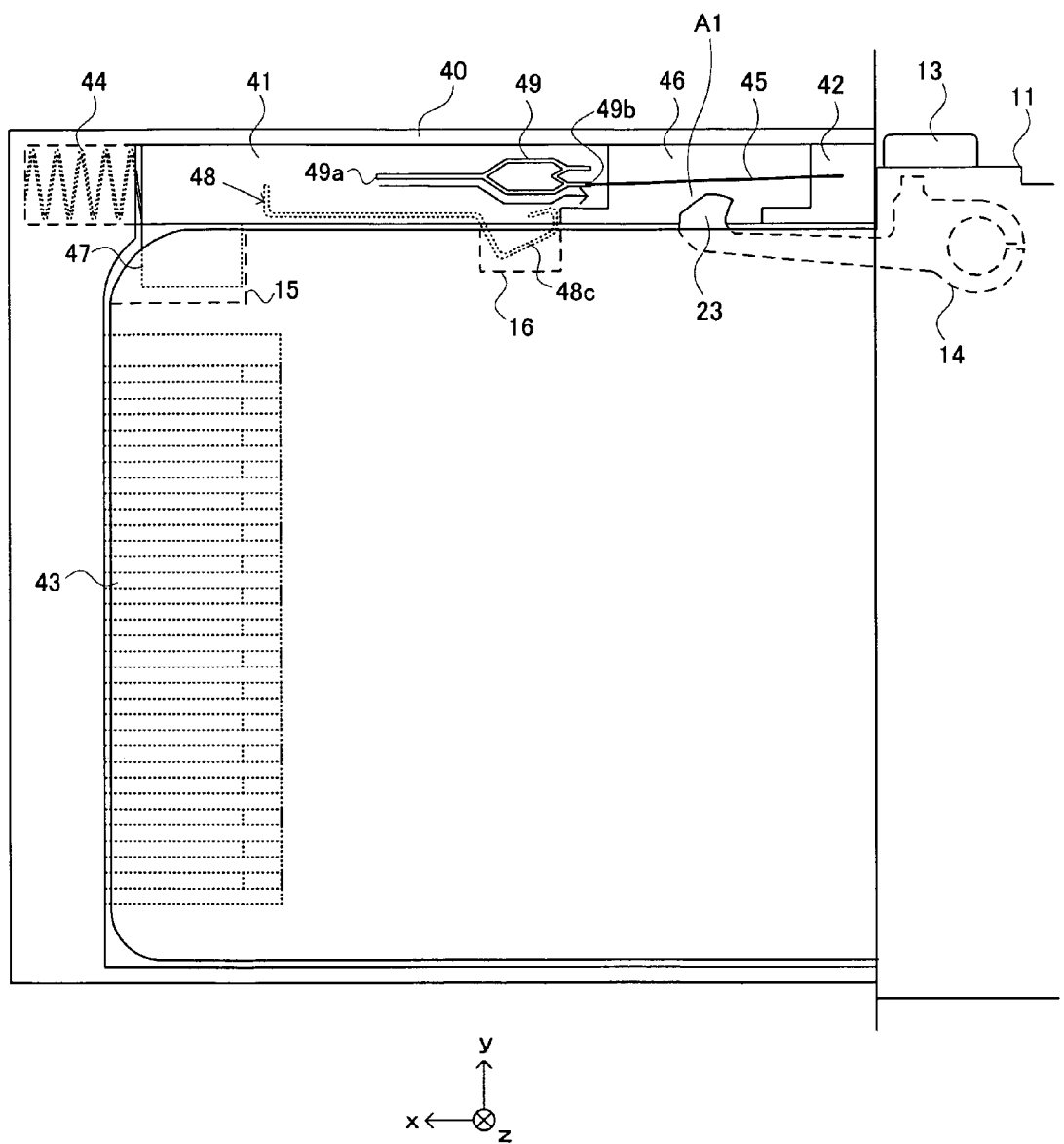
FIG. 14 is a diagram showing a state where the insertion part 11a of the antenna cartridge 1 is inserted further deeper inside than the state shown in FIG. 13.

FIG. 14 is a diagram showing a state where the insertion section 11a of the antenna cartridge 1 is inserted further deeper inside than the state shown in FIG. 13. In FIG. 14, the front edge of the insertion section 11a of the antenna cartridge 1 abuts against the inside wall at the far side end of the insertion slot 8. As above described, when the antenna cartridge 1 moves further deeper into the far side of the insertion slot 8 from the state where the first recessed portion 15 is engaged with the projecting portion 47, the antenna cartridge 1 moves integrally with the slide member 41. Therefore, when the slide member 41 slides deep inside, an air gap A1 is generated between the slide member 41 and the pin supporting member 42. Accordingly, if the slide member 41 and the pin supporting member 42 are regarded as a part of a side surface inside the insertion slot 8, a recessed portion is created on the side surface inside the insertion slot 8. As shown in FIG. 14, when the antenna cartridge 1 is inserted, the latch portion 23 of the hook 14 is inserted into the recessed portion. When the state shown in FIG. 13 shifts to the state shown in FIG. 14, the latch portion 23 abuts against the pin supporting member 42. In this state, the latch portion 23 is pushed by the pin supporting member 42, and thus the hook 14 rotates, whereby the latch portion 23 is housed inside the insertion section 11a. As shown in FIG. 14, when the slide member 41 moves integrally with the antenna cartridge 1, a position of the end of pin 45 changes from a first end 49a to the second end 49b of the heart cam 49 (see an arrow shown in FIG. 14). A length of the pin 45, and a shape and a size of the heart cam 49 are designed such that the end of the pin 45 is positioned at the second end 49b of the heart cam 49 when the front edge of the insertion section 11a of the antenna cartridge 1 abuts against the inside wall at the far side end of the insertion slot 8.

When the game cartridge 9 is inserted and the front edge thereof abuts against the inside wall at far side end of the insertion slot 8, the game cartridge 9 moves integrally with the slide member 41 in the same manner as the case of the antenna cartridge 1. In this case, the end of the pin 45 moves from the first end 49a to the second end 49b of the heart cam 49. An air gap A1 is generated when the slide member 41 moves. However, a hook is not inserted into the air gap A1 since the game cartridge 9 does not have the hook.

Figure 15:
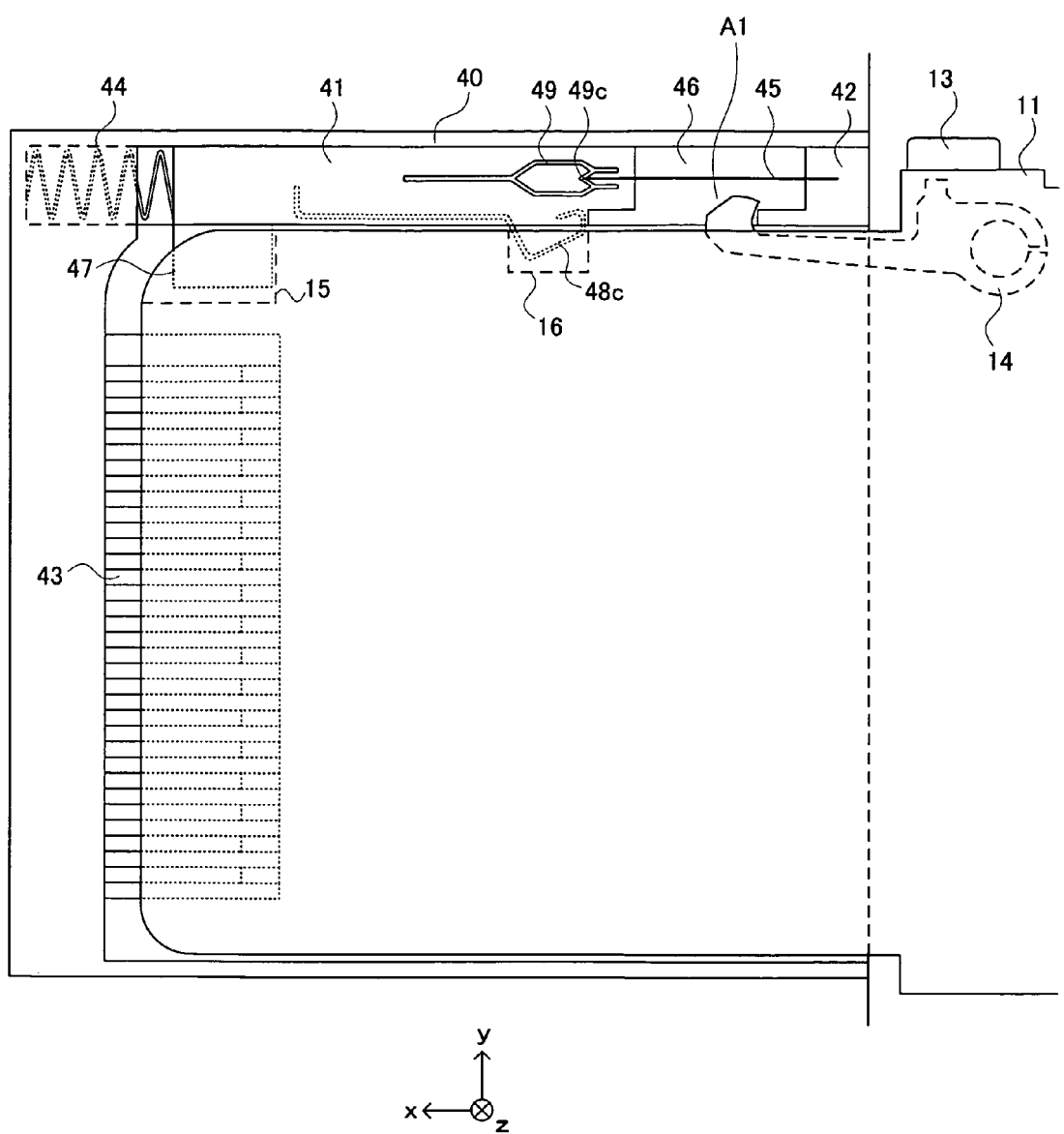
FIG. 15 is a diagram showing a state where a user has released the hand from the antenna cartridge 1 after inserting the insertion part 11a, which is the state shown in FIG. 14.

FIG. 15 is a diagram showing a state where a user has released the hand from the antenna cartridge 1 after inserting the insertion section 11a, which is the state shown in FIG. 14. When the front edge of the insertion section 11a of the antenna cartridge 1 abuts against the inside wall at the far side end of the insertion slot 8 (FIG. 14), the spring 44 biases the slide member 41 in a direction from the far side to the near side of the insertion slot 8. Therefore, when the user stops inserting the insertion section 11a and releases the hand from the antenna cartridge 1 in the above-described state, the slide member 41 and the antenna cartridge 1 move to the near side of the insertion slot 8. In accordance with this movement of the slide member 41, the end of the pin 45 moves from the second end 49b to the sharp angle portion 49c of the heart cam 49. Although the slide member 41 is biased, by the spring 44, toward the near side, the slide member 41 does not move further toward the near side since the end of the pin 45 is positioned at the sharp angle portion 49c. Further, in the case of the antenna cartridge 1, when the end of the pin 45 is positioned at the sharp angle portion 49c of the heart cam 49, the latch portion 23 of the hook 14 latches onto the side surface inside the insertion slot 8 (specifically, on the pin supporting member 42) (that is, sizes of the hook 14 and the pin supporting member 42 are designed to be latched onto each other).

In the case where the game cartridge 9 is inserted, the slide member 41 operates in the same manner as the case where the insertion part 11a of the antenna cartridge 1 is inserted. That is, when the user has released the hand from the game cartridge 9 from a state where the front edge of the game cartridge 9 abuts against the inside wall at the far side end of the insertion slot 8, the slide member 41 and the game cartridge 9 move toward the near side of the insertion slot 8. In accordance with this movement of the slide member 41, the end of the pin 45 moves from the second end 49b to the sharp angle portion 49c of the heart cam 49. Accordingly, the slide member 41 does not move further toward the near side, but stops. When the game cartridge 9 is inserted, a hook is not latched onto the side surface inside the insertion slot 8 since the game cartridge 9 does not have the hook.

As above described, in the case of the game cartridge 9, when the protruding portion 48c is inserted inside the second recessed portion 92, the slide member 41 and the game cartridge 9 are fixed to each other, and the end of the pin 45 is latched onto the sharp angle portion 49c of the heart cam 49, whereby the game apparatus 5 and the game cartridge 9 are fixed to each other. On the other hand, in the case of the antenna cartridge 1, when the protruding portion 48c is inserted inside the second recessed portion 16, the slide member 41 and the antenna cartridge are fixed to each other, and the end of the pin 45 is latched onto the sharp angle portion 49c of the heart cam 49, whereby the antenna cartridge and the game apparatus 5 are fixed to each other. Further, the antenna cartridge 1 and the game apparatus 5 are also fixed to each other when the latch portion 23 of the hook 14 is latched onto the pin supporting member 42. When the cartridge (the antenna cartridge 1 or the game cartridge 9) is inserted, the connection terminals 18 or 93 provided on the cartridge abut against the connection terminals 43 provided at the far side end of the insertion slot 8. Therefore, the cartridge is electrically connected to the game apparatus 5. Accordingly, the game apparatus 5 is capable of causing the game program to be read and executed via the cartridge, or of receiving the digital broadcasting.

In the antenna cartridge 1, if the hook 14 is not provided while the antenna cartridge 1 is fixed as above described, the antenna cartridge 1 and the game apparatus 5 are fixed together only by latching the protruding member 48 of the slide member 41 of the game apparatus 5 onto the second recessed portion 16 of the antenna cartridge 1. As above described, when a force is applied to the protruding member 48, the protruding member 48 is housed inside the slide member 41. Therefore, when the antenna cartridge 1 is fixed only with the protruding member 48, the antenna cartridge 1 may be released from the slide member 41 (the protruding member 48 is disengaged from the second recessed portion 16) only with a little force, and may be dismounted from the insertion slot 8. As above described, the antenna cartridge 1 has the portion protruding from the insertion slot 8. Therefore, when the user pulls the protruding portion, or when the user accidentally drops the game apparatus 5 while the antenna cartridge 5 is inserted therein, the protruding portion receives an impart, and consequently the antenna cartridge 1 is likely to be dismounted from the insertion slot 8. On the other hand, according to the present embodiment, the antenna cartridge 1 is engaged with the insertion slot 8 not only with the protruding member 48 of the slide member 41 but also with the hook 14. Therefore, compared to a case where the antenna cartridge 1 is engaged with the insertion slot 8 only with the protruding member 48, it is possible to fix the antenna cartridge 1 to the insertion slot 8 solidly.

Figure 16:
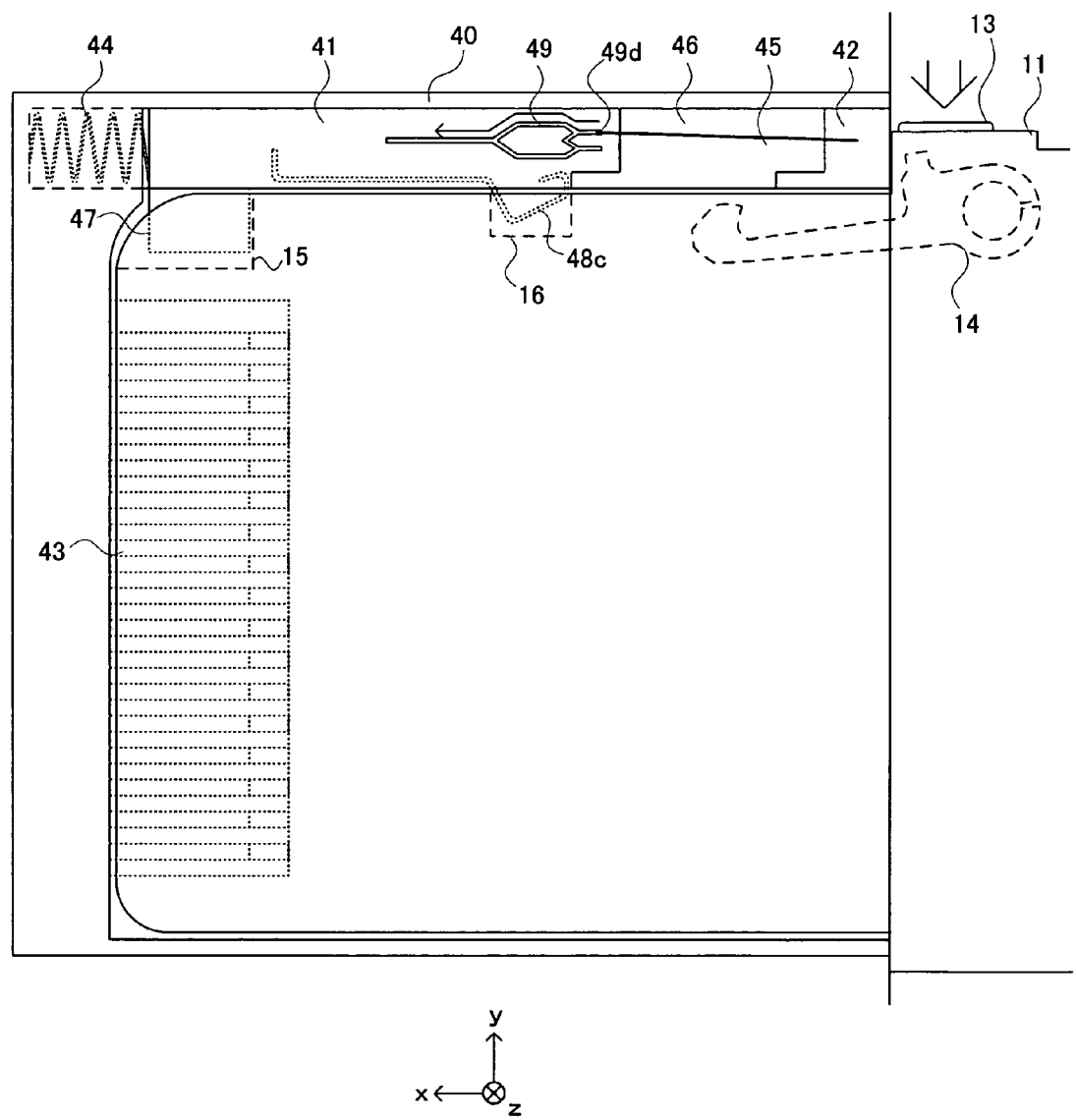
FIG. 16 is a diagram showing a state where the antenna cartridge 1 is ejected from the insertion slot 8 from the state shown in FIG. 15.

FIG. 16 is a diagram showing a state where the antenna cartridge 1 is ejected from the insertion slot 8 from the state shown in FIG. 15. When the antenna cartridge 1 is to be ejected from the insertion slot 8, the user again pushes the antenna cartridge 1, which is mounted in the insertion slot 8 (in the state shown in FIG. 15), to the far side end of the insertion slot 8. Accordingly, the slide member 41 moves integrally with the antenna cartridge 1, and the position of the end of the pin 45 changes from the sharp angle portion 49c to the third end 49d. Accordingly, the pin 45 is released from being latched onto the sharp angle portion 49c, and the slide member 41 is biased by the spring 44 and is moved toward the near side. In the case of the antenna cartridge 1, the user further needs to press the button 13 of the cartridge 1 while the insertion section 11a of the cartridge 1 is inserted deep into the far side end of the insertion slot 8. Accordingly, the latch portion 23 of the hook 14 is housed inside the housing 11 (see FIGS. 9 and 16). Accordingly, the latch portion 23 of the hook 14, which is latched onto the pin supporting member 42, has been released therefrom. The antenna cartridge 1 is then moved to the near side of the insertion slot 8 while the button 13 is being pressed, whereby it is possible to eject the antenna cartridge 1 from the insertion slot 8. That is, in this state, the pin 45 moves from the third end 49d to the first end 49a (see an arrow shown in FIG. 16), and thus the end of the pin 45 is not latched onto the sharp angle portion 49c of the heart cam 49. Further, the hook 14 is not latched onto the pin supporting member 42. Accordingly, the antenna cartridge 1 is ejected from the insertion slot 8.

In order to dismount the game cartridge 9 from the insertion slot 8, the game cartridge 9, which is mounted in the insertion slot 8, may be pushed to the far side end of the insertion slot 8, in the same manner as the case of the antenna cartridge 1. Accordingly, the slide member 41 moves integrally with the game cartridge 9, and the position of the end of the pin 45 changes from the sharp angle portion 49c to the third end 49d. Accordingly, the pin 45 is released from being latched onto the sharp angle portion 49c, and the slide member 41 is biased by the spring 44 and is moved toward the near side. The game cartridge 9 is pushed toward the near side integrally with the slide member 41, and consequently protrudes from the insertion slot 8. Therefore, the user can dismount the game cartridge 9 from the insertion slot 8. Since the game cartridge 9 is not latched onto the insertion slot 8 with the hook, the user does not need to operate the button unlike the case of the antenna cartridge 1, but only needs to push the game cartridge 9 again into the far side end of the insertion slot 8 while the game cartridge 9 is mounted therein.

As above-described, according to the present embodiment, the hook 14 is included in the antenna cartridge 1, and when the antenna cartridge 1 is mounted into the insertion slot 8, the hook 14 is latched onto a predetermined portion (the pin supporting member 42 in the present embodiment) inside the insertion slot 8. Accordingly, it is possible to solidly fix the antenna cartridge 1 to the game apparatus 5. Further, the insertion slot 8 in the present embodiment is configured with the conventional push-in/push-out insertion/removable mechanism. In other words, according to the present embodiment, it is possible to fix the attachment device to the electronic apparatus without additionally providing the electronic apparatus (game apparatus 5) with a mechanism for preventing the attachment device from being dismounted, the attachment device being highly likely to be dismounted due to having a portion protruding from the insertion slot or having a heavy weight, for example.

In the present embodiment, it is possible to solidly fix the antenna cartridge 1 to the game apparatus 5 with the hook 14. When a strong force is applied to the antenna cartridge 1 which is mounted in the game apparatus 5, the strong force is also applied to the hook 14. When an impact is applied to the antenna cartridge 1, for example in the case where the user accidentally drops the game apparatus 5 having the antenna cartridge 1 mounted therein or bumps the same against some material, a strong force is applied to the antenna cartridge 1 in a direction such that the antenna cartridge 1 is dismounted from the insertion slot 8. In this case, the strong force is applied to the latch portion 23 of the hook 14, and consequently the hook 14 may be broken. Typically, the hook 14 may be folded down at the connecting portion between the arm 22 and the latch portion 23. Particularly, under a situation where the antenna cartridge 1 protrudes outward from the insertion slot 8, like the case of the present embodiment, when the user accidentally drops the game apparatus 5 having the antenna cartridge 1 mounted therein or bumps the same with some material, the strong force is likely to be applied to the antenna cartridge 1, and consequently the hook 14 is likely to be broken.

Figure 17:
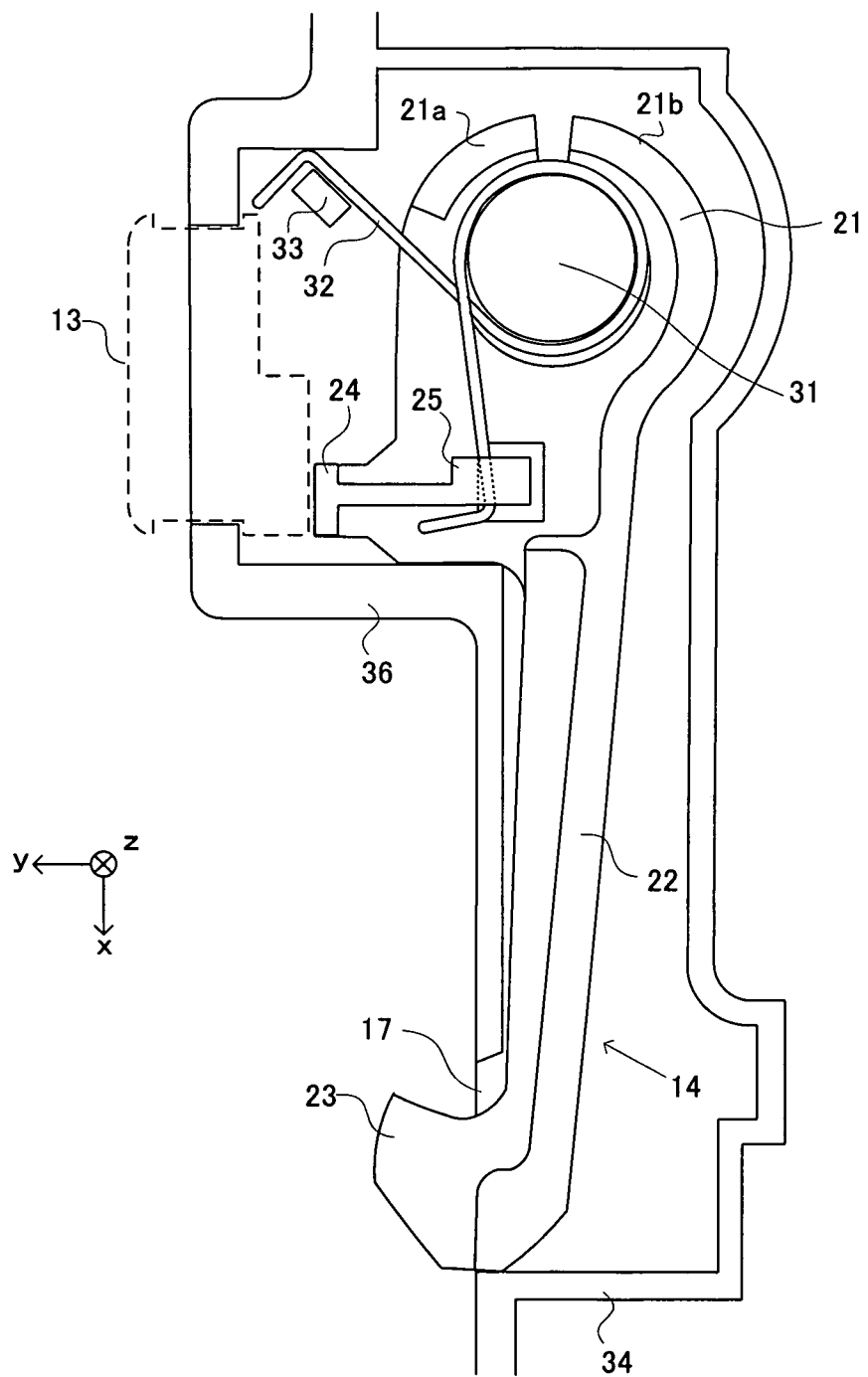
FIG. 17 is a diagram showing a hook 14 in the case where a force is applied in a direction such that the antenna cartridge 1 is to be dismounted.

Therefore, in the present embodiment, a slit is provided to the ring portion 21 of the hook 14, whereby the force applied to the latch portion 23 of the hook 14 is reduced. FIG. 17 is a diagram showing the hook 14 in a state where a force is applied to the antenna cartridge 1 in a direction such that the antenna cartridge 1 is to be dismounted from the game apparatus 5, while the antenna cartridge 1 is mounted in the game apparatus 5. When the force is applied to the antenna cartridge 1 in the direction such that the antenna cartridge 1 is to be dismounted, a force is applied to the latch portion 23 of the hook 14 from the pin supporting member 42 toward the x-axis positive direction shown in the diagram. In this case, the ring portion 21 receives a tensile force (tension) from the arm 22 in a direction toward the arm 22. In the present embodiment, since the slit is provided to the ring portion 21 of the hook 14, when the above-described tension is applied to the ring portion 21, the ring portion 21 become deformed as shown in FIG. 17. That is, the ring portion 21 is deformed such that the two forearm portions 21a and 21b thereof open out. Further, when the ring portion 21 is deformed, the hook 14 is moved toward the x-axis positive direction (FIG. 17). Since the force applied to the latch portion 23 is eased by the deformation of the ring portion 21 and movement of the hook 14, it is possible to prevent the hook 14 from being broken. Further, in the case where the force applied to the latch portion 23 is released, the hook 14 is returned to the original position due to a restoring force of the deformed ring portion 21.

Further, in the present embodiment, with respect to the hook housing portion (housing 11) of the antenna cartridge 1, the partition wall 34 is provided at the x-axis positive side of the hook 14. Therefore, when the hook 14 is moved toward the x-axis positive side, the end of the hook 14 at the x-axis positive side abuts against the partition wall 34, whereby the movement of the hook 14 is limited. Accordingly, it is possible to prevent the ring portion 21 from being disengaged completely from the spindle 31. In the present embodiment, at the x-axis positive side of the connecting portion 22a between the ring portion 21 and the arm 22, the outside wall 36 of the housing 11 is provided. Therefore, in the present embodiment, the movement of the hook 14 is also limited by the outside wall 36.

As above described, according to the present embodiment, it is possible to engage the antenna cartridge 1 with the insertion slot 8 of the game apparatus 5 by using the hook 14, whereby it is possible to solidly mount the antenna cartridge 1 into the game apparatus 5. Further, the slit is provided to the ring portion 21 of the hook 14, whereby it is possible to cause the hook 14 to be deformed when the strong force is applied to the hook 14. Accordingly, it is possible to prevent the hook 14 from being broken.

(Modified Embodiment of Hook)

In the above-described embodiment, in order to prevent the hook 14 from being broken, the cut (slit) is formed in the ring portion 21. Here, the slit may be formed at any position of the ring portion 21, and preferably, the slit is formed at a position opposite to the connecting portion 22a between the ring portion 21 and the arm 22. Accordingly, when the hook 14 moves, a force is equally applied to both of the forearm portions 21a and 21b, which sandwich the slit of the ring portion 21. Consequently, a degree of the deformation of the ring portion 21 is small, which prevents the hook 14 from being broken easily.

Further, in the above-described embodiment, the cut (slit) is provided in the ring portion 21 in order to prevent the hook 14 from being broken. The ring portion may be configured so as to be deformable in the case where the tensile force from the arm is applied to the ring portion while the ring portion is pivoted by the spindle (i.e., in the case where a force is applied to the hook such that the hook is moved away from the spindle). Hereinafter, with reference to FIGS. 20 and 21, modified embodiments of the hook will be described.

Figure 18:
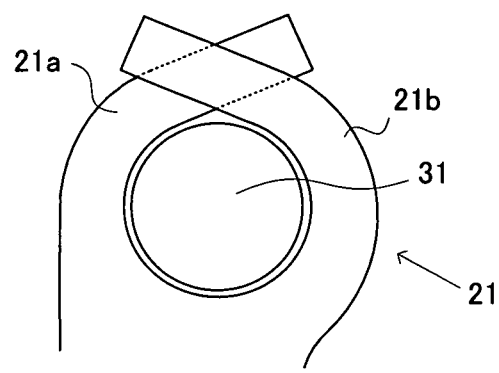
FIG. 18 is a diagram showing a ring portion 21 of the hook 14 according to a first modified embodiment.

FIG. 18 is a diagram showing the ring portion 21 of the hook 14 according to a first modified embodiment. As shown in FIG. 18, in the first modified embodiment, at the side opposite to the connecting portion with the arm 22, the two forearm portions 21a and 21b are configured so as to be partially overlapped with each other. In other words, at the side opposite to the connecting portion with the arm 22, the ring portion 21 is not connected through, but has portions which are vertically overlapped with each other. The configuration shown in FIG. 18 also causes the ring portion 21 to be deformed in the case where the tensile force from the arm is applied to the ring portion 21. Further, in the case where the tensile force applied thereto is released, the ring portion 21 is returned to an original state and pivoted due to the restoring force. Therefore, when the hook 14 shown in FIG. 18 is used, the same effect as the above-described embodiment can be achieved. In the case where the configuration shown in FIG. 18 is applied, it is possible to extend a movable distance of the hook 14 (a distance in which the hook 14a is movable without the ring portion 21 being disengaged from the spindle 31) compared to the case of the above-described embodiment.

Figure 19:
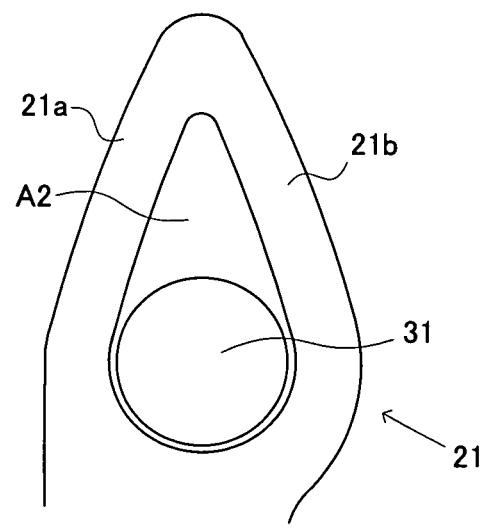
FIG. 19 is a diagram showing the ring portion 21 of the hook 14 according to a second modified embodiment.

FIG. 19 is a diagram showing the ring portion 21 of the hook 14 according to a second modified embodiment. As shown in FIG. 19, in the second modified embodiment, the two forearm portions 21a and 21b grasp the spindle 31 so as to form an air gap A2 between the spindle 31 and the forearm portions 21 and 21b at the side opposite to the connecting portion between the ring portion 21 and the arm 22. A width of the air gap A2 (a length in a direction perpendicular to a normal line direction of the spindle 31) is designed to be smaller than a diameter of the spindle 31. Further, in FIG. 19, front ends of the two forearm portions 21a and 21b are connected to each other. However, the front ends of the two forearm portions 21a and 21b do not need to be connected to each other. With the configuration shown in FIG. 19, the ring portion 21 is also deformable in the case where the tensile force from the arm is applied thereto. When the tensile force applied thereto is released, the ring portion 21 is returned to in the original state and pivoted due to the restoring force. Therefore, by using the hook 14 shown in FIG. 19, it is possible to achieve the same effect as above-described embodiment. When the configuration shown in FIG. 19 is applied, the ring portion 21 is not disengaged from the spindle 31.

(Modified Embodiment of Partition Wall)

Figure 20:
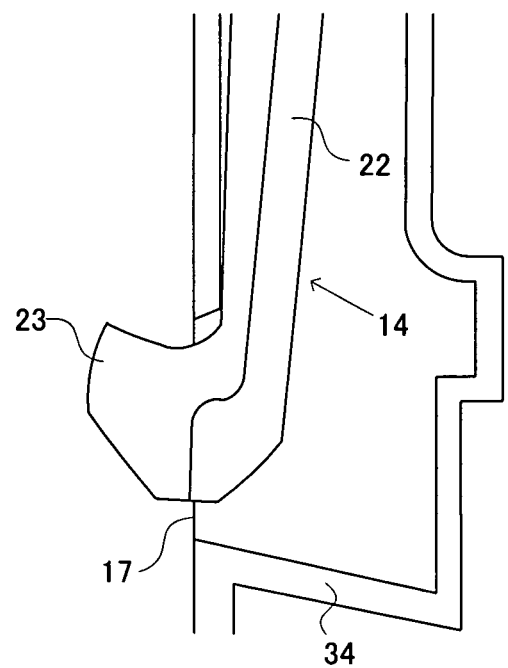
FIG. 20 is a diagram showing a configuration of a partition wall 34 according to another embodiment.
Figure 21:
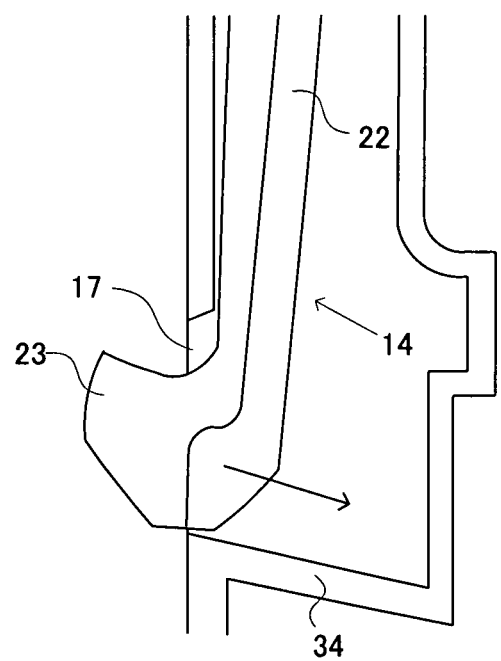
FIG. 21 is a diagram showing a case where, in the configuration shown in FIG. 20, the hook 14 abuts against the partition wall 34.

In the above-described embodiment, the partition wall 34 shown in FIG. 8 is arranged so as to be substantially perpendicular to the moving direction of the hook 14 (at the x-axis positive side). In an alternative embodiment, the partition wall 34 may be arranged such that the latch portion 23 is moved to be housed inside the insertion section 11a when the hook 14 collides against the partition wall 34. FIG. 20 is a diagram showing a configuration of the partition wall 34 in another embodiment. In FIG. 20, the partition wall 34 is arranged so as to be angled with respect to a direction perpendicular to the moving direction of the hook 14. Specifically, the partition wall 34 is formed such that the hook hole 17 widens as it goes from an opening portion thereof to an inside of the insertion section 11a. FIG. 21 is a diagram showing a case where, in the configuration shown in FIG. 20, the hook 14 abuts against the partition wall 34. When the ring portion 21 is deformed by a large force applied to the hook 14, and consequently the hook 14 is moved, then the latch portion 23 of the hook 14 collides against the partition wall 34 as shown in FIG. 21. In this case, since the partition wall 34 is formed so as to be angled with respect to a direction perpendicular to the moving direction (the x-axis positive direction) of the hook 14, the latch portion 23 of the hook 14, which has collided against the partition wall 34, is moved and housed inside the insertion section 11a. Therefore, the state, where the latch portion 23 is latched onto the predetermined portion inside the insertion slot 8 (the pin supporting member 42), is released, and then the hook 14 is disengaged from the predetermined portion. The hook 14 is disengaged from the predetermined portion, and a large force having been applied to the hook 14 is released. Accordingly, it is possible to securely prevent the hook 14 from being broken. In the above-described embodiment, the partition wall of a planar shape is used as a member for limiting the movement of the hook 14, however, a bar-shape (columnar-shape) member may be used.

In the above-described embodiment, the hook 14 shown in FIG. 7 is used as an exemplary latching portion which is inserted into the recessed portion generated by sliding the slide member 41, and which latches onto the side surface inside the insertion slot 8. The latching portion may have any structure as long as the latching portion is capable of being inserted into the recessed portion, and of latching onto the side surface inside the insertion slot 8. For example, the hook is not necessarily rotatably connected to the housing 11, but may be slidably connected to the housing so as to allow the latch portion 23 to move toward the inside or outside of the hook hole 17. In this case, it is preferable that the latch portion 23 is housed inside the housing 11 by operating the button 13. For example, the ring portion of the hook does not necessarily have a slit. The ring portion may have a structure in which an inner diameter thereof is substantially the same as a diameter of the spindle 31 (that is, the ring portion 21 will not be deformed even if a force is applied thereto).

As above described, a feature of the present embodiment is to prevent the attachment device from being accidentally dismounted from the electronic apparatus which does not have a particular mechanism for preventing the dismounting, and for example, the present embodiment is applicable to an attachment device or the like which is to be mounted to an electronic apparatus such as a game apparatus.

While the embodiment presented herein has been described in detail, the foregoing description is in all aspects illustrative and not restrictive. It is understood that numerous other modifications and variations can be devised without departing from the scope of the embodiment.

What is claimed is:

1. An attachment device mountable into an insertion slot provided in an electronic apparatus, wherein
 a moving member in the electronic apparatus is provided at a side surface inside the insertion slot, and is movable, between a near side and a far side of the insertion slot, in a moving area provided along the side surface inside the insertion slot,
 the attachment device comprises:
  a housing which has a predetermined portion abutting against an abutment portion of the moving member when the attachment device is inserted into the insertion slot, and which causes the moving member to move toward a far side of the insertion slot when the predetermined portion is further inserted into the insertion slot while being abutting against the abutment portion; and
  a latch portion which is inserted into an air gap generated in the moving area when the moving member moves toward the far side, and which latches onto the side surface inside the insertion slot.

2. The attachment device according to claim 1, wherein the moving member of the electronic apparatus has a projecting portion, and
 the predetermined portion is a front edge portion of the housing, the front edge portion abutting against the projecting portion when the housing is inserted into the insertion slot.

3. The attachment device according to claim 1, wherein the housing has a hole on a side surface thereof, and supports the latch portion such that a part of the latch portion is protrusible from the hole,
 the attachment device further comprises:
  an elastic member for biasing the latch portion such that the part of the latch portion protrudes outward from the housing through the hole; and
  a button which is operable outside the housing, and which is operated to cause the elastic member to be elastically deformed such that the part of the latch portion is housed inside the housing.

* * * * *